June 21, 1960   M. E. GOULD ET AL   2,941,717
AUTOMATIC CLASSIFYING SYSTEM
Filed Dec. 31, 1952   9 Sheets-Sheet 9
Fig. 10.
| | MONTH | | | | DECADE | | | | YEAR | | | |
|---|---|---|---|---|---|---|---|---|---|---|---|---|
| | 1 | 2 | 3 | 4 | 5 | 6 | 7 | 8 | 9 | 10 | 11 | 12 |
| JAN. | ▮ | | | | 1 ▮ | | | | 1 ▮ | | | |
| FEB. | | ▮ | | | 2 | ▮ | | | 2 | ▮ | | |
| MAR. | | | ▮ | | 3 | | ▮ | | 3 | | ▮ | |
| APR. | | | | ▮ | 4 | | | ▮ | 4 | | | ▮ |
| MAY | ▮ | ▮ | | | 5 ▮ | ▮ | | | 5 ▮ | ▮ | | |
| JUN. | ▮ | ▮ | | | 6 | ▮ | ▮ | | 6 | ▮ | ▮ | |
| JUL. | | | ▮ | ▮ | 7 | | ▮ | ▮ | 7 | | ▮ | ▮ |
| AUG. | ▮ | | ▮ | | 8 ▮ | | ▮ | | 8 ▮ | | ▮ | |
| SEP. | | ▮ | | ▮ | 9 | ▮ | | ▮ | 9 | ▮ | | ▮ |
| OCT. | ▮ | | | ▮ | 10 ▮ | | | ▮ | 10 ▮ | | | ▮ |
| NOV. | ▮ | ▮ | ▮ | | | | | | | | | |
| DEC. | | ▮ | ▮ | ▮ | | | | | | | | |
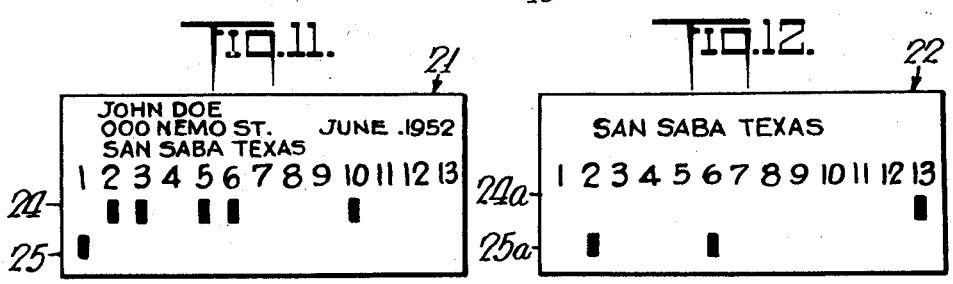
Fig. 11.   Fig. 12.
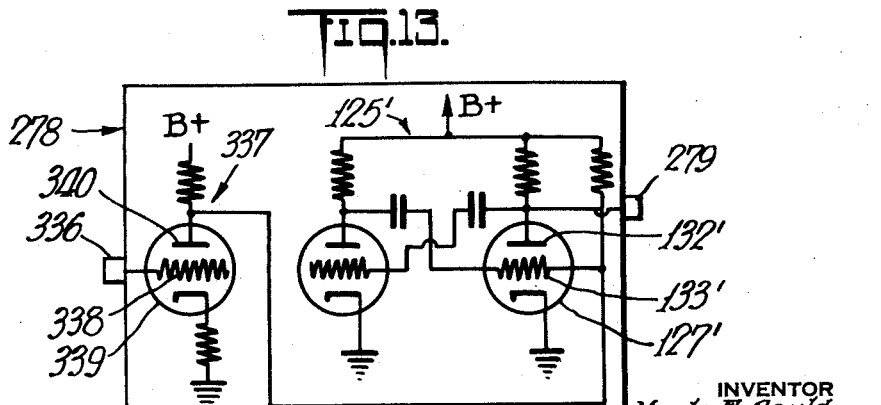
Fig. 13.
INVENTOR
Merle E. Gould
Salvatore A. DiCecio
BY
Dean Fairbank & Hirsch
ATTORNEYS ated June 21, 1960

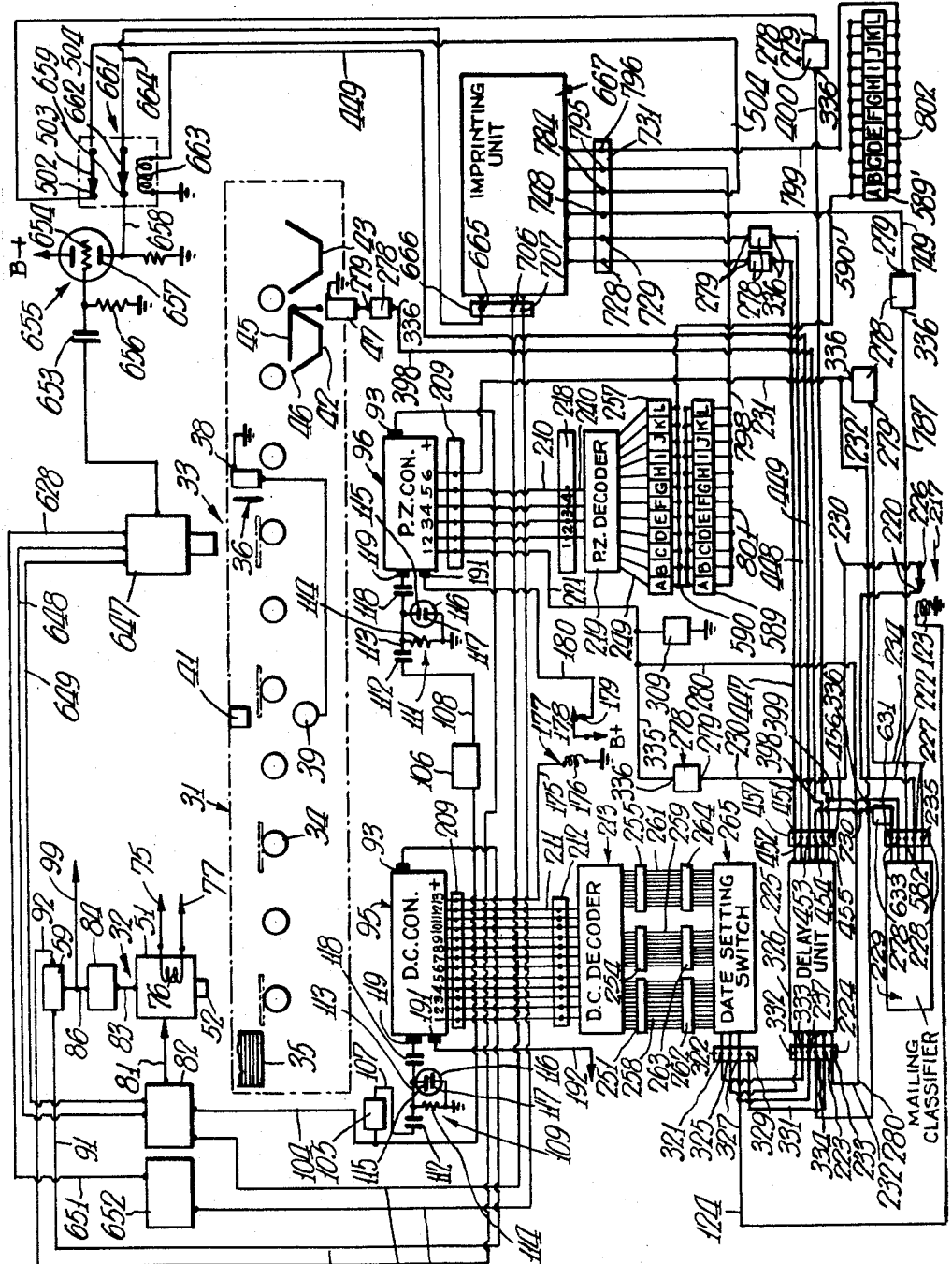

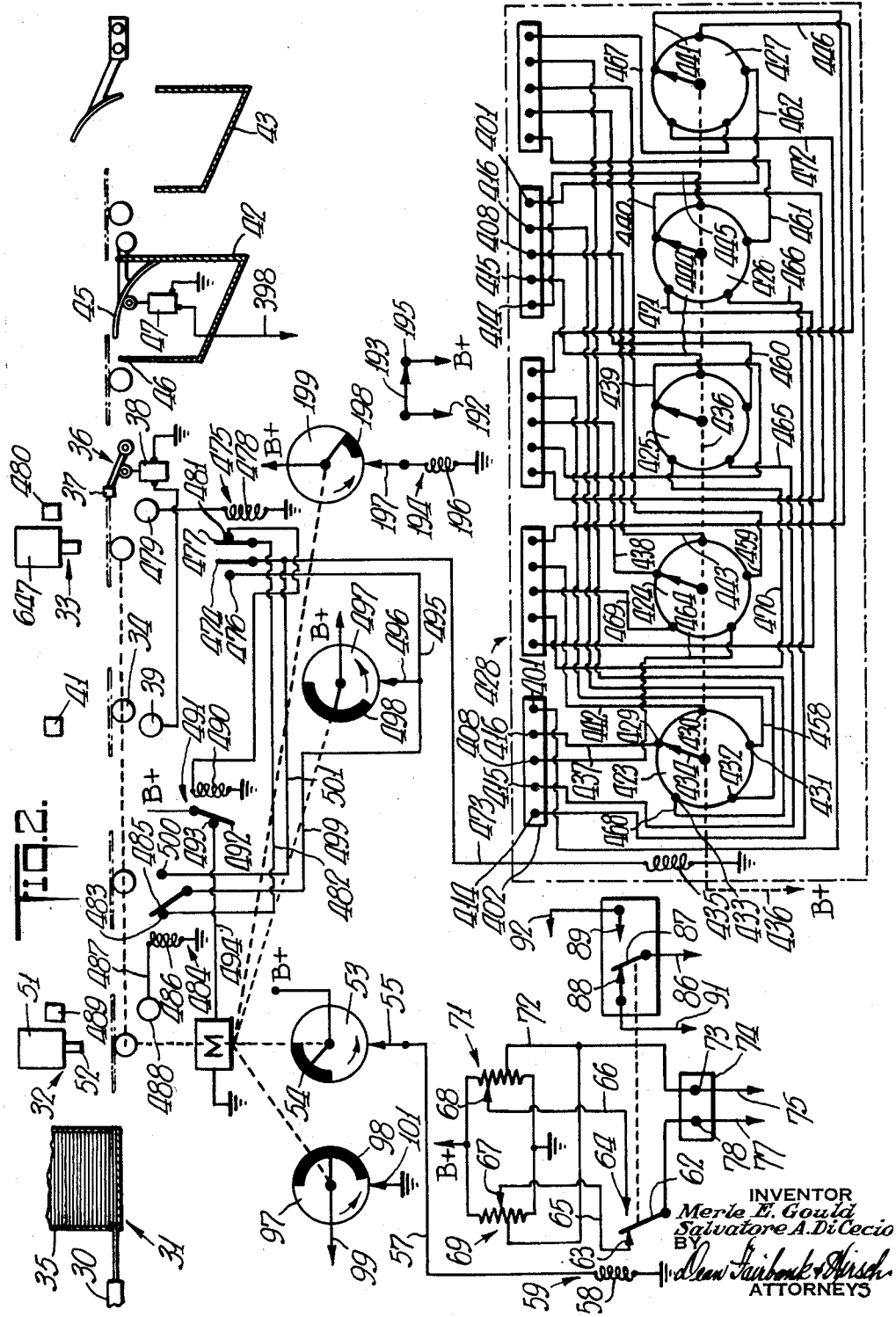

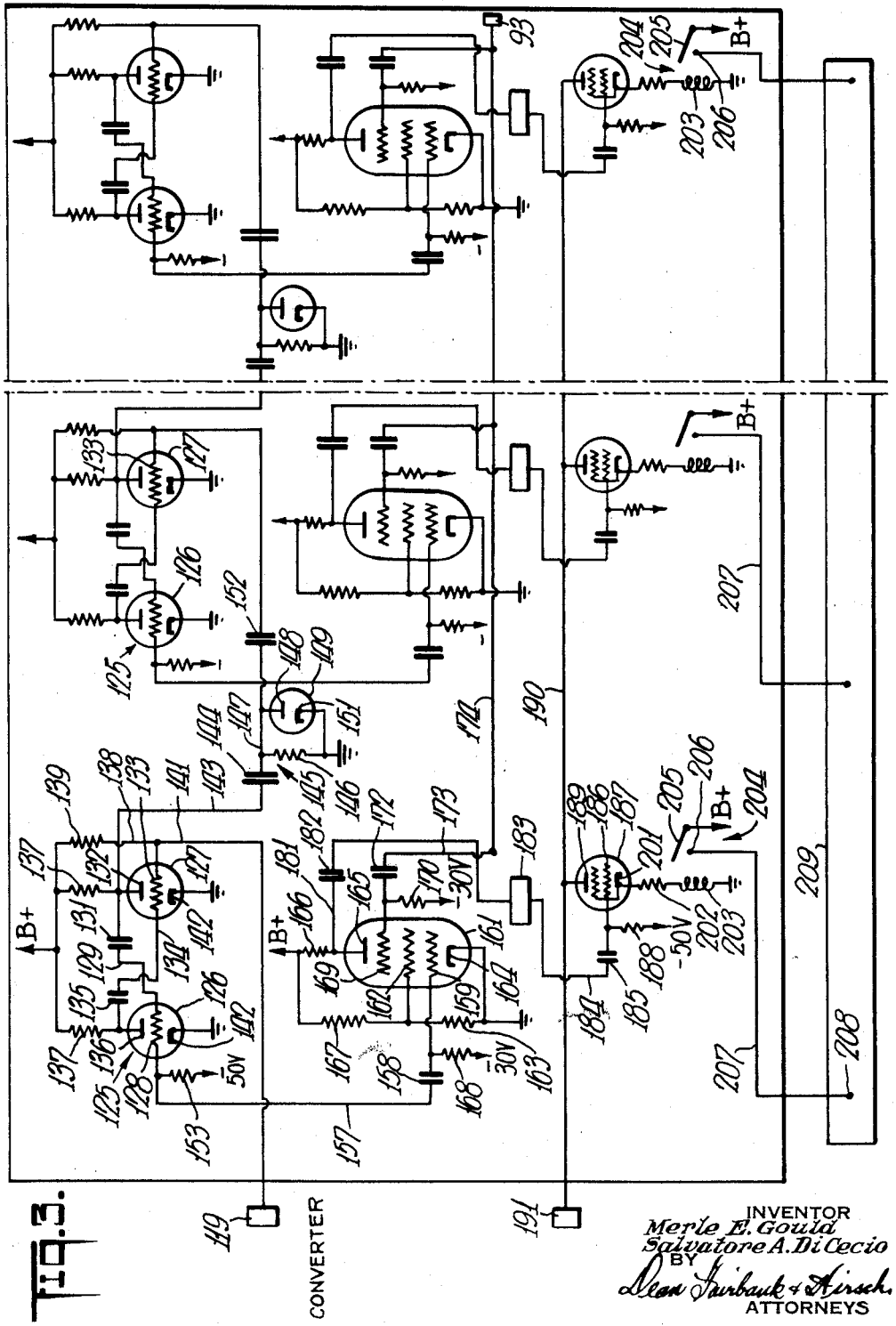

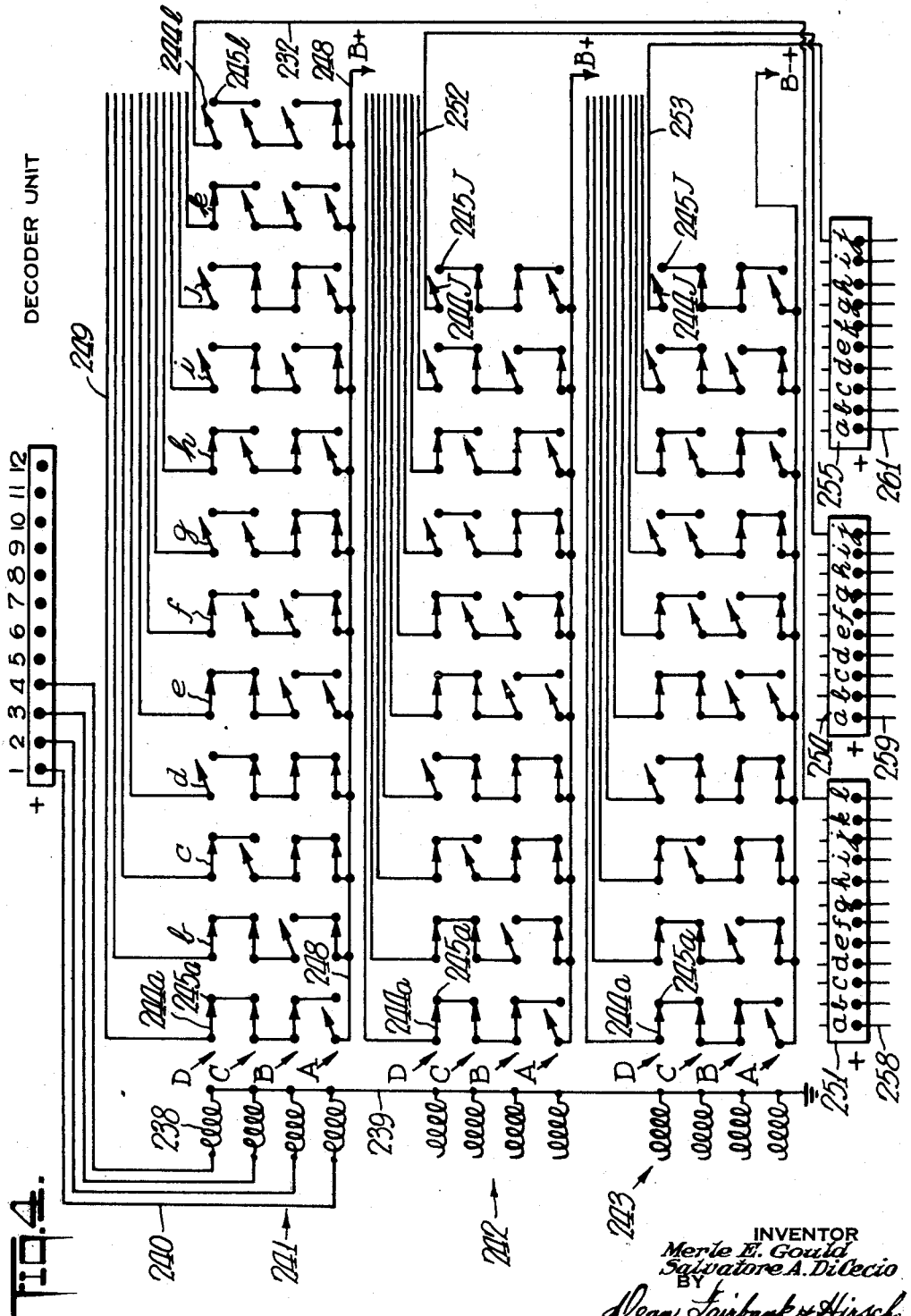

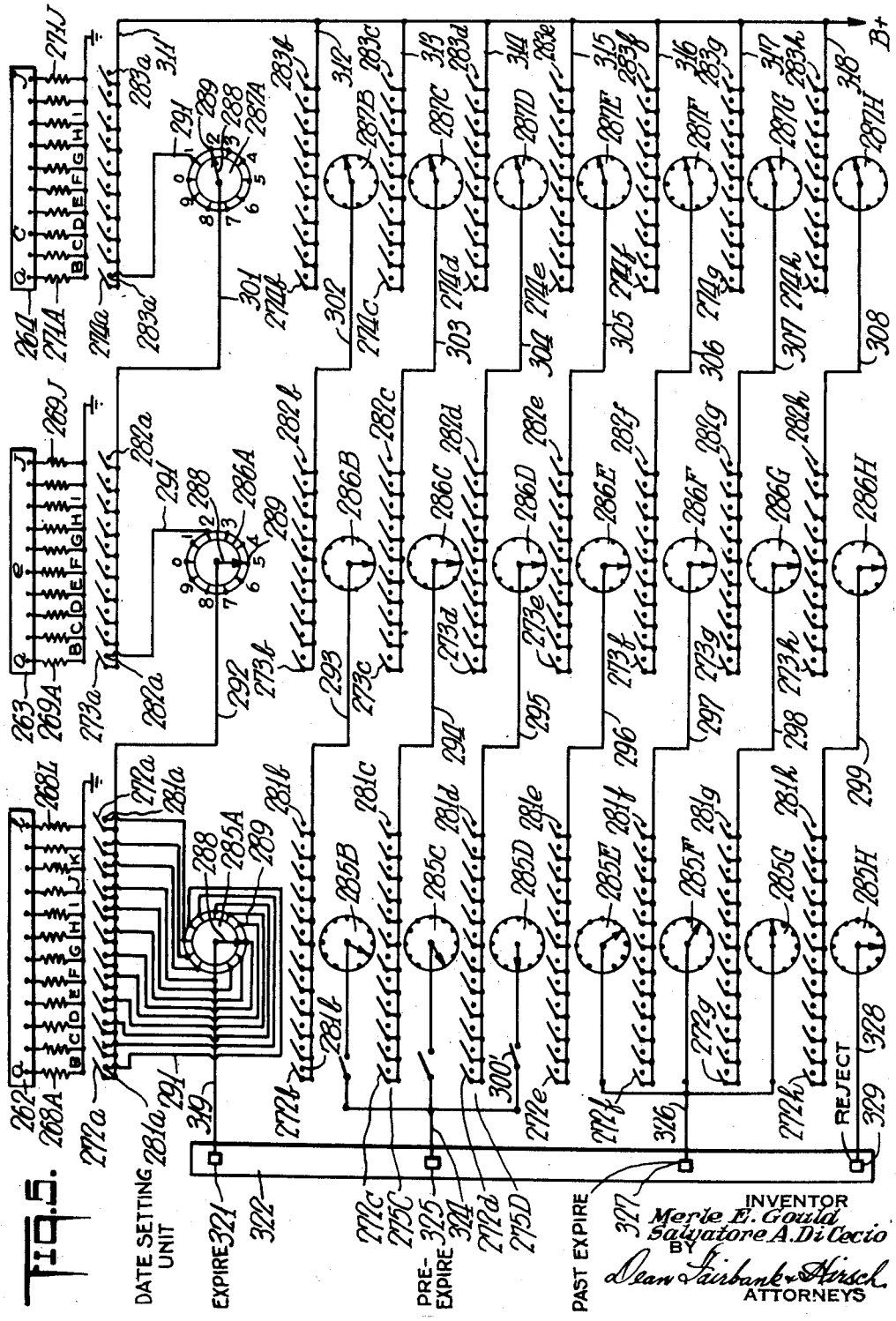

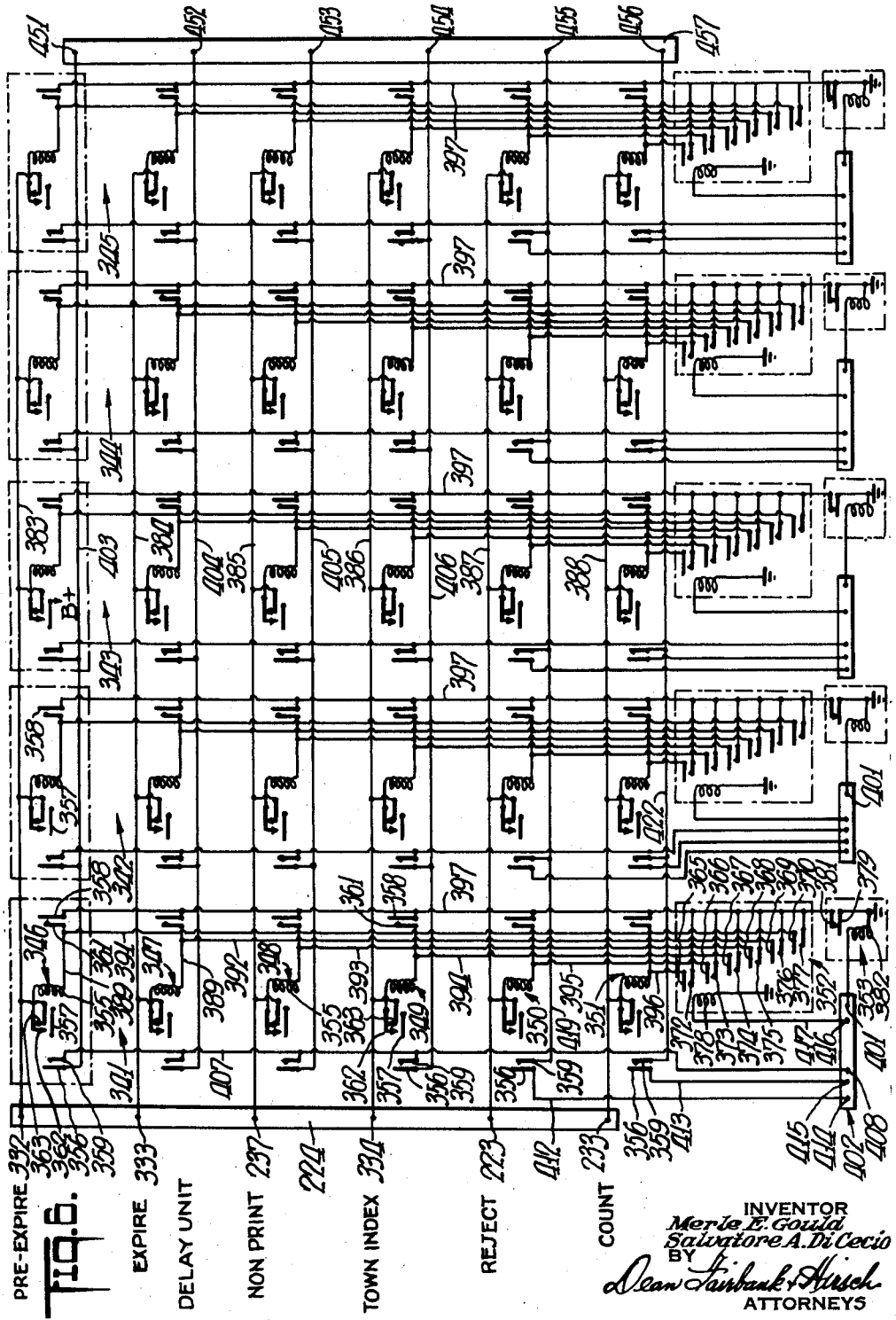

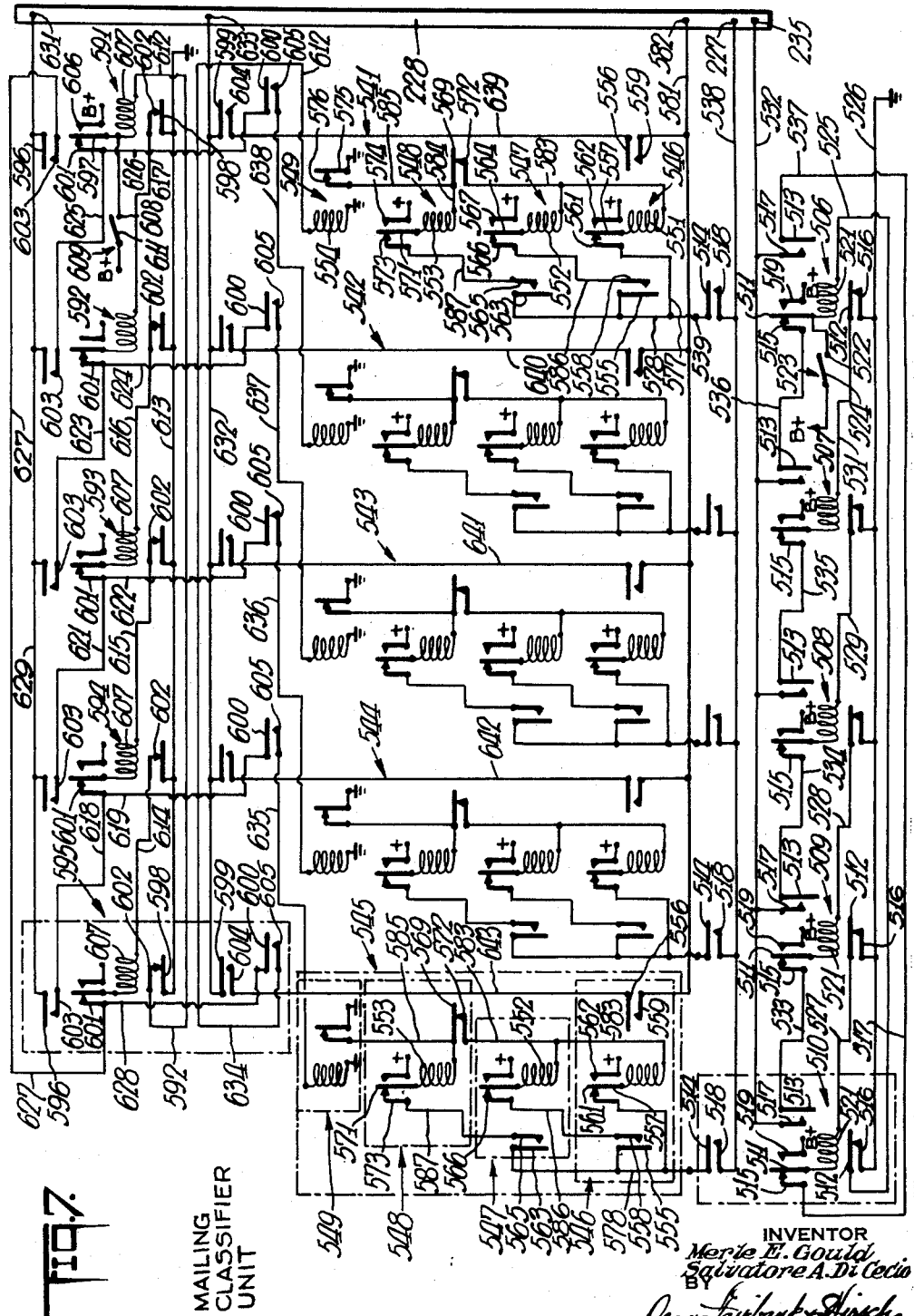

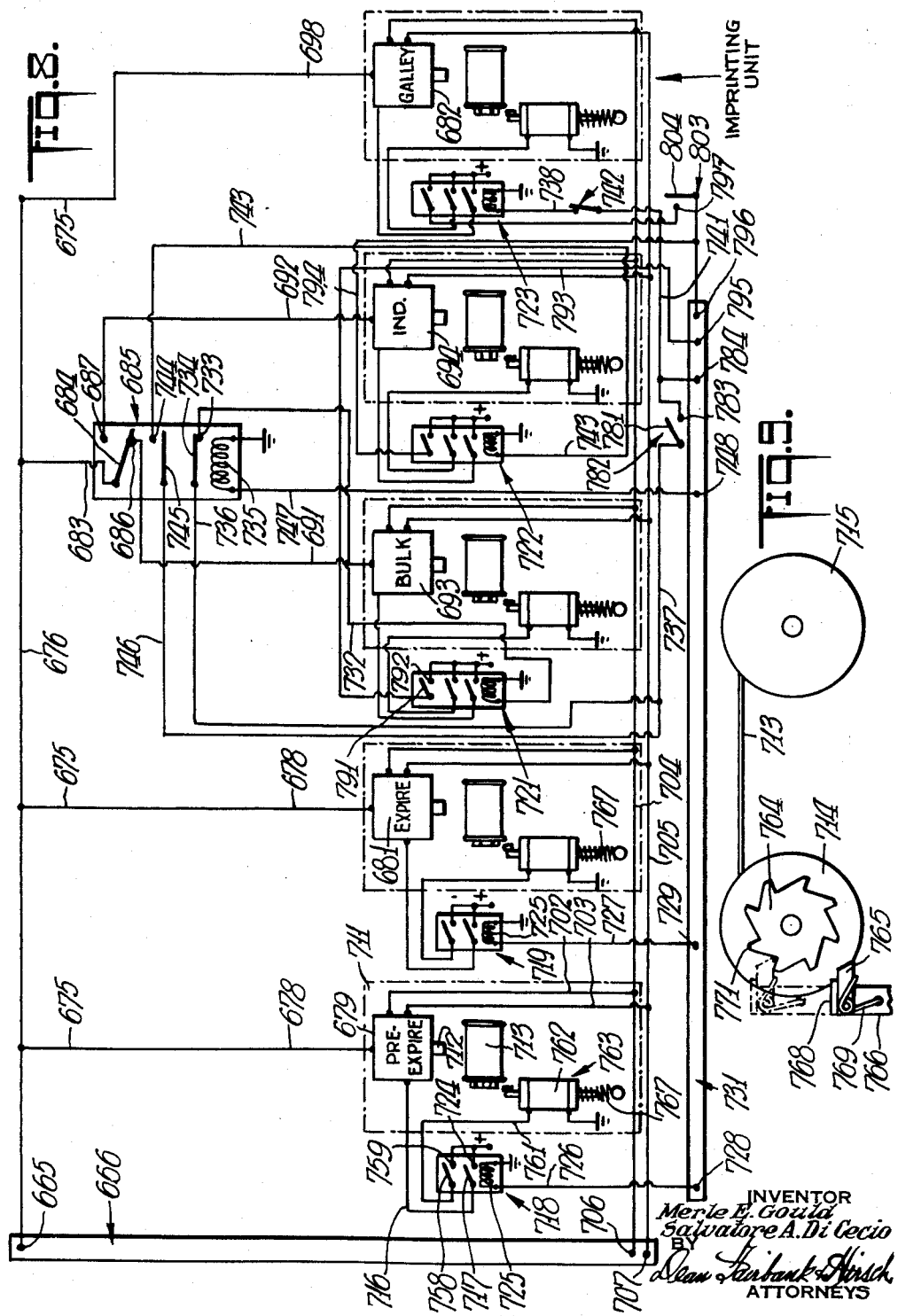

United States Patent Office

2,941,717
AUTOMATIC CLASSIFYING SYSTEM

Merle E. Gould, Stamford, Conn., and Salvatore A. Di Cecio, New York, N.Y., assignors to Self Winding Clock Company, Inc., New York, N.Y., a corporation of Delaware Filed Dec. 31, 1952, Ser. No. 328,944

24 Claims. (Cl. 235—61.9)

This invention relates generally to the art of automatic classification and computation and has application in a large number of fields including among others, but not limited to control of subscription fulfilment, of inventory, production and sales, dividend and benefit payments and sending of notices.

It is among the objects of the invention to provide a system for counting, tabulating, sorting, selecting or reproduction of items in whole or in part according to desired classification in any of numerous groupings that need not be mutually exclusive, including the ejection of predetermined items, all in a single run of the data bearing medium, by sensing code designations associated with each of the items, which code controls one or more instrumentalities that effect the actual classification, as by way of example, in the form of imprinted lists.

Another object is to provide a system of decoding by which the code may be sensed at a high rate of speed, without the retardation, wear and error incident to mechanical sensing and more particularly to utilize as the carrying medium of both the data and code designations thin, light and inexpensive elements such as strips or cards of paper upon which the data and code may be imprinted or inscribed or pictured by any ordinary or conventional means and which carrying medium when passed through the system is not subject to wear at the regions having the data or the code.

Another object is to effect classification of items arranged in categories, which classification is determined by the number of items in each category and to accomplish this in the same run by which the foregoing classification is effected.

While in its broadest application by no means so limited, the invention is desirably carried into execution by imprinting each item with its associated code designations upon a suitable data bearing medium which may be an individual data sheet, strip or card, and by imprinting a group code designation upon index sheets, strips or cards arranged in appropriate position as by association with various categories of such data sheets, strips or cards, all such sheets, strips or cards desirably being of identical size and shape and being fed through the system in sequence, the group classification being distinguished from classification that is determined by the data on the individual data sheets, strips or cards.

An illustrative application hereinafter described is particularly designed for periodical or magazine subscription fulfilment.

For any subscription fulfilment procedure, lists must first be prepared from master subscription files, of pertinent subscription data for each copy of each issue of a periodical. Such lists include among other items the name and address of each current subscription, as well as the date of expiration, which data are imprinted upon mailing strips, for example, so that the printer may sever the lists into segments, each bearing a name and address for application to each item to be mailed.

In addition to the relatively high cost of fabricating and imprinting or embossing the subscription data upon individual metal or plastic printing plates where such are used, such plates are bulky, difficult to handle and with repeated use often produce illegible or blurred imprints.

The manual removal from the usually extensive master files of the plates of expiring subscriptions necessitates much personnel for timely completion of subscription fulfilment, with attendant high cost and likelihood of human error.

Where, for mechanical sorting by suitable ejecting mechanism the plates are notched in order to eject from the master file those corresponding to expiring subscriptions, the time required for such mechanism to coact with such notches renders the operation correspondingly slow. In addition, any deformation of the notches due to wear and tear of the plates, may lead to erroneous ejection of a still current subscription plate and retention of a plate of an expiring subscription.

Where such plates must preliminarily be passed through sorting mechanism for removal of those of expiring subscriptions, the additional personnel and time required add correspondingly to the cost of subscription fulfilment.

Where, in order to accelerate the printing of subscription data strips, such plates are linked together in a reeled chain, there is the objection of bulk and weight. Automatic removal from such chain, of plates representing expiring subscriptions is not feasible and the manual relinking of the severed chain after each such removal is also a slow and costly operation.

Where the plates of subscriptions currently expiring (designated "expire") and those to expire in the ensuing few months (designated "pre-expire") are segregated from the master file, as for instance for facility of discard and for distribution of promotional literature, a number of serious objections arise, among which are the following:

(a) In addition to running all plates through a printing machine to prepare lists of current subscriptions, the pre-expire plates must be run through repeatedly to prepare lists for distribution of promotional literature or the like.

(b) After each periodic subscription fulfilment, the plates of subscriptions expiring in the earliest month which are in the maser file must be manually removed therefrom to form a new pre-expire file.

(c) For each town, the subscriptions appearing on the printed lists prepared from the master file, the expire file and the pre-expire files (one to three or more files in number) must be combined and coordinated to ascertain which subscriptions may be bulk mailed. Unless this procedure is accurately followed, added expense of individual mailing is incurred, even though the aggregate subscriptions in the various files for a given town may be adequate in number for bulk mailing. Even where the subscriptions for the same town are adequate in number for bulk mailing, but are in a plurality of files, there is the added cost of separately packaging and handling such subscriptions if they are not first combined.

(d) In certain procedures upon expiration of subcriptions, the corresponding plates are discarded so that the data thereon are no longer available for renewal classification. Where a subscription fulfilment procedure retains the plates of expired subscriptions for one or more predetermined months in one or more past expire files, then when a subscription is received, these files as well as all current subscription files must be searched to determine whether such subscription is a new or renewal subscription.

The many operations necessitated by a plurality of files, preparatory to each subscription fulfilment requires trained personnel who must work carefully if error is to be minimized, and since these operations must be performed within close date limits, the required personnel is extensive, involving great cost and increasing the element of error.

It is accordingly among the objects of the invention, when applied to subscription fulfilment, to provide a system which is dependable in operation and not likely to become deranged, and which functions without error, and which requires no metal or plastic data plates, but wherein lightweight, small-bulk cards (to which the subscription fulfilment data may easily be applied) arranged in a single, relatively compact file may be successively sensed in a single relatively high speed automatic operation, substantially without the need for supervision or clerical personnel, correctly to classify the subscription data, and more particularly to perform in such single operation all or any number of the following functions, all without the necessity of in any way removing or displacing cards from the file:

(a) To produce a strip containing the data of all current subscriptions, (b) To produce a strip containing the data of all current subscriptions for bulk mailing, (c) To produce a strip containing the data of all current subscriptions for individual mailing, (d) To produce strips of expire subscriptions, (e) To produce strips of pre-expire subscriptions, (f) To omit from any strips the data from predetermined cards although such cards are retained in the file, (g) To omit from any strips the data on predetermined index cards used to segregate groups of subscription cards, (h) To provide that the omissions of data mentioned in items (f) and (g) cause no blank spaces to appear in any strips so as to assure that each segment of any strip used for addressing a periodical or other piece of literature will bear the necessary subscription data and not be blank, (i) To eject predetermined cards from the file.

According to an illustrative embodiment of the invention, imprinted subscription data as well as associated date code designations are sensed by suitable means and the code initiates corresponding electrical impulses, which in turn, through suitable circuits, selectively control instrumentalities that may include imprinting means to reproduce the data.

The number and position of the designations determines the code which may be in the form of bars imprinted not more than one at each of any plurality of regions on a card. The sequence of bars may be sensed by a suitable electronic means, selectively to actuate associated switches that correspond one to each region of the card.

The electronic sensing means provides electrical impulses at intervals corresponding to the spacing of the code designations on the card. In addition, periodic electrical impulses are generated corresponding in number to the number of regions on the card and of predetermined duration. Desirably the sensing of the code designations and the generator of such periodic impulses are started substantially simultaneously. The switches have characteristics such as to be rendered effective only when subjected at the same time to both a periodic and a code initiated impulse, whereby only those switches that correspond to code designations will be actuated for conversion of the date code into electrical settings.

The switches selectively set by any code, transmit impulses which may be decoded, as for instance by means of multi-pole switches with various permutations and combinations in the open and closed positions of their elements. The decoded impulses control the circuit through a date setting switch that has been pre-set according to the classification to be effected by the system so that the code on each card determines its classification.

The system may include at least one recorder responding to an expire setting, at least one recorder responding to a pre-expire setting and at least one recorder under control of a common code designation on every subscriber card, all of said recorders which are desirably video receivers (normally inoperative) being fed from a copying camera.

Some of the recorders, more particularly those for imprinting expire and pre-expire lists are controlled from the date code designations, and the other recorders, more particularly those for imprinting a master or galley list, and bulk and individual mailing lists of current subscriptions, are controlled from the common code designation on all subscription cards.

In a desirable embodiment, the code designations upon the card are scanned at a sensing station by an electronic beam and the card is then advanced to a second position or copying station where the imprinted data is scanned by another electronic beam. Electrical impulses initiated at the sensing station by the date code designations are utilized selectively to ready circuits that are rendered effective to cause selective imprinting by one or more of said recorders only when that card reaches the copying station.

In order automatically to classify subscription cards for each town into those for bulk mailing and those for individual mailing, town index cards of the same size and shape as the subscription cards may be positioned at the beginning of each sequence of subscription cards. The town index cards have one common code bar (designated an index bar) in a definite region thereof. That index bar controls a mailing classifier which determines the start and stop of the count of each set of subscription cards to discriminate between those for bulk and those for individual mailing.

Such index bar, in the embodiment shown, is desirably on a row out of registry with that bearing the date code designations on the subscription cards. The scanning camera has means timed to deflect the electronic beam to scan such second row on each card after the first row has been scanned.

If the number of subscription cards between successive town index cards is at least equal to the minimum for bulk mailing rates, then the code designation that all subscription cards have in common, renders active the recorder that prepares the bulk rate list and thus imprints on such list the data on each card up to the next town index card. If the number of subscription cards between successive town index cards should be less than the minimum required for bulk mailing, then when the first subscription card reaches the copying station the recorder for the individual rate list will be switched into circuit and the common code designation on such subscription cards will render active such recorder and thus imprint upon the individual mailing list the data on each card up to the next town index card.

The town index card in addition to the common code designation, may have code designations determining postal zone, which desirably are converted and decoded in manner similar to the conversion and decoding of the subscription data and the number of individual issues to be sent to each postal zone may be indicated on a suitable counter.

Electrical impulses correlated with the original code on a subscription card representing a subscription that has expired prior to the current month sets up circuits which preclude operation of any of the recorders when such card reaches the copying station. Moreover, such circuits exclude an impulse to the mailing classifier which determines the discrimination between bulk and individual mailing rates.

Other objects are in part obvious and in part pointed out hereinafter.

The invention while more particularly claimed herein as a system regarded either as an equipment or as a method, is not so limited, but embraces also within its scope certain of the individual units as shown on separate sheets of the drawings and as described under separate headings in the specification, among which units are the code converter unit, the decoder unit, the pre-set selective unit, the delay signal unit and the group classifier unit.

In the accompanying drawings in which are shown one or more of various possible embodiments of the several features of the invention, Fig. 1 is a circuit diagram of the system, Fig. 2 is a view similar to Fig. 1 on a larger scale showing the feeding mechanism, the stepping switch and the scanning beam deflecting relay, Fig. 3 is a circuit diagram of the date code converter unit, Fig. 4 is a circuit diagram of the date decoder unit, Fig. 5 is a circuit diagram of the date setting switch, Fig. 6 is a circuit diagram of the delay unit, Fig. 7 is a circuit diagram of the mailing classifier unit, Fig. 8 is a circuit diagram of the imprinting unit, Fig. 9 is a fragmentary side elevational view on a larger scale of the paper strip advancing mechanism, Fig. 10 is a chart of the code utilized on the cards, Fig. 11 is a plan view of a subscription card, Fig. 12 is a similar view of a town index card, and Fig. 13 is a circuit diagram of one of the inverter-multivibrator units used in the system.

To facilitate understanding of the invention, a general description of one particular embodiment, shown in the nine sheets of drawings will first be made, followed by the more particularized description under various headings thereafter.

Each of the subscription cards carries code designations, one within each of from three to seven of twelve possible regions unequivocally to designate the month, decade and year. These code designations are scanned by an electronic beam of a video camera at a sensing station and impulses therefrom are transmitted at corresponding intervals to a date code converter.

That date code converter has a plurality of multivibrators connected to fire in sequence and corresponding in number at least to the number of code regions on the card. The time constant of each multi-vibrator is such that they will all fire within the period it takes the electronic beam to scan the row occupied by the twelve or more regions and the time constant of each multi-vibrator is substantially equal to the time it takes the electronic beam to scan an entire code region. The firing of the first of the sequence of multi-vibrators is initiated from a square wave generator, desirably the same square wave generator that times the operation of the sweep generator that controls the electronic beam of the video camera.

An output of each multi-vibrator is connected to a grid of a corresponding coincidence gate tube which receives impulses from its associated multi-vibrator and therefore in sequence. At the same time, the impulse due to the code designations on the card, is applied simultaneously to a second grid of each of the gate tubes, so that the gate tube which has an impulse on two grids at any one time will conduct and therefore only those gate tubes that correspond to the code designations will be rendered conductive and the others remain non-conducting.

The conducting gate tubes energize corresponding thyratron tubes which in turn energize corresponding relays of a date decoder, that comprises a sequence of multipole switches.

A date setting unit which comes next in the system may comprise a multiplicity of manually set dial switches corresponding to month, decade and year for expire, pre-expire, reject and like classifications. Where the card bears a date code corresponding thereto, a circuit will be closed through such date setting unit to effect the appropriate classification or selection of such card in manner hereinafter more fully set forth.

The system includes a video receiver under control of the expire setting, a video receiver under control of the pre-expire setting and at least one video receiver under control of a common code designation on every subscription card, all of said receivers being fed from a video camera at a copying station, but being normally inoperative as by reason of a blocking bias. The system also includes an electrically responsive ejection gate under control of the reject setting.

The cards (expire, pre-expire or reject) that are classified or selected by the date setting unit establish a circuit to a delay unit which may comprise a sequence of memory units which are successively readied by the action of a stepping switch timed with the card movement so that one or more relays in each readied memory unit may be energized upon completion of circuits thereto.

The great bulk of the cards, which are of current subscriptions, that is, cards that are not expire, pre-expire, reject or the like, will not be affected by the date setting unit. However, the code designation that all subscription cards have in common also establishes a circuit to the delay unit. Relays of the delay unit are selectively actuated by the establishment of such circuits, depending on the message transmitted through the date setting switch or from the common code designation on the subscription card and by appropriate holding circuits, the setting of such relays is maintained.

Each card is advanced from the sensing station to the camera at the copying station, but is held stationary at the respective stations for such slight interval as is sufficient to permit scanning.

By the time such subscription card has reached the copying station, the stepping switch will effect closure of a circuit through such relays of the memory units as had been previously set from that card, to remove from those video receivers that are associated with set memory relays, the blocking bias normally thereon, and the unblocked receiver or receivers will imprint the subscription data from the card onto sensitized paper strip or strips, intermittently advanced in conventional manner.

As each card leaves the copying station, the stepping switch will clear the memory unit associated therewith by opening the holding circuits for the energized relays of such memory unit to re-cycle the latter.

Those cards slated for rejection by the date setting switch will, upon leaving the copying station, be intercepted by the electrically responsive reject gate.

To determine whether the subscriptions to any one town benefit by bulk mailing rates, means are provided automatically to discriminate between subscriptions for any one town that total in excess of a given number and those that total no greater than the given number.

To this end, all subscription cards for any town are preceded by a single town index card which bears a code designation or index bar common to all such index cards, that is scanned at the sensing station to ready a counting system for determining the said discrimination.

If less than such given number of subscription cards (for bulk mailing rate) follows the town index card, appropriate circuits are completed as each subscription card reaches the copying station to acuate a relay which switches the output of the electronic camera at the copying station (that scans the imprinted data on the subscription cards), from a bulk mailing receiver to an individual mailing receiver.

More particularly to the counting system comprises a sequence of counting units, each having a number of relays related to the minimum number of subscriptions entitled to bulk mailing rate. The common code designation or index bar on the index card is effective when at the sensing station to ready one counting unit. Subscription cards as they then pass the sensing station become effective, by virtue of the code designation thereon common to them all, to actuate in sequence the relays of the readied counting unit. Should a succeeding town index card follow before the minimum number of preceding subscription cards for bulk mailing rate has been reached, the common code designation or index bar on such succeeding town index card will ready the next succeeding counting unit to count subscription cards and as the subscription cards associated with the first town index card reach the copying station, the switch will be actuated to shift from the bulk mailing receiver for which the system is normally set to the individual mailing receiver.

In addition to the index bar on the town index card, there are code designations illustratively on the same line which correspond to postal zone data. It is of course to be understood that the code for determining postal zone could be on the subscription cards but, since the index cards are used for the town index bar, it is much to be preferred to imprint such postal zone code on the town index card. To convert and decode the postal zone code designations and town index bar, there is a corresponding postal zone converter and decoder which may operate on the same principle as the date code converter and decoder, but with a lesser number of components.

In the illustrative embodiment herein, two sets of counters are associated with the postal zone decoder, each corresponding in number to the number of postal zones. One of the counters of each of the sets will be readied by each town index card. Depending upon whether the data on the cards following that town index card is imprinted on the bulk or individual list, the readied counter associated with either bulk or individual mail will be actuated.

There will now be described one particular embodiment of the invention under various headings.

Cards

In the illustrative embodiment herein shown, the cards are of two distinct types, i.e., subscription cards 21 and town index cards 22 (Figs. 11 and 12) respectively.

As shown in Fig. 11, the subscription card desirably has indicia such as the name and address of the subscriber as well as the date of expiration of the subscription. In addition, there are illustratively thirteen equal regions on a locus. This locus is illustratively a straight line four inches long and the thirteen regions are thus aligned in a row 24 along which are positioned a plurality of suitable designations, preferably in the form of bars, no more than one within a region, the number and position of which bars on said row form a code corresponding to the expiration date.

The code bars corresponding to the expiration date are arranged in three sets, of from one to four bars each. The first set of designations may be the code for the month, the second set for the decade and the third set for the year. As shown in chart 10 (Fig. 10) the months of January, February, March and April may be represented by a bar at regions 1, 2, 3 and 4 respectively. The months of May through October may be represented each by two bars respectively at regions 1, 2; 2, 3; 3, 4; 1, 3; 2, 4 and 1, 4. The months of November and December may be represented by three bars respectively at regions 1, 2, 3 and 2, 3, 4. Similarly, the decades from 1 to 10 and the years 1 to 10 may be represented by one or two bars at regions 5 to 8 inclusive and 9 to 12 inclusive respectively. These bars may correspond in number and position to the single or two bars used for the months January to October respectively as appears clearly from Fig. 10.

As shown, each bar only occupies a portion of its associated region and the thirteenth region on the row 24 of the subscription card, in the illustrative embodiment, is left unoccupied.

The subscription card also has a single bar within the first region on a second row 25, said first region being aligned with the first region on row 24. This bar is a universal code designation common to all subscription cards and serves to initiate an impulse for each card in the manner hereinafter to be described.

The town index card 22 shown in Fig. 12 illustratively has the name of the town and state printed thereon and has five regions for designations, also in the form of bars, desirably placed within the second to the sixth region on a row 25a which corresponds in position to the second row 25 on the subscription card. By placing one or more designations or bars in the second to the fifth region, a code can be set up similar to the month code shown in Fig. 10 but corresponding to the particular one of, say, twelve postal zones for example (relative to the point of mailing), in which the town marked on the town index card is located. The marking in the sixth region on the town index card is the "index" indicator and serves as a group code designation in the manner hereinafter to be described.

In addition, the card 22 has a row 24a which corresponds in position to row 24 on subscription card 21 and a "reset" bar is marked at the thirteenth region on line 24a, the function of which will be hereinafter set forth.

The subscription cards 21 of a particular locality are desirably stacked in a suitable hopper 35 (Figs. 1 and 2), so that they follow the town index card 22, to be acted upon by the equipment in the manner hereinafter described.

Referring now to Fig. 1 of the drawings, in which substantially the entire system is diagrammatically shown, the equipment which classifies the cards above described for subscription fulfilment desirably comprises a feeding and sorting unit 31 which is shown in greater detail in Fig. 2.

Feeding and sorting unit

The feeding and sorting unit 31 shown in Figs. 1 and 2 desirably has a horizontal conveyor system 34 for advancing the cards from a code sensing station 32 to a copying station 33.

Means are desirably provided successively to advance the bottommost card in the storage hopper 35 in which the cards are stacked to the sensing station 32; to retain such card at the sensing station for a given period of time and thereupon to advance the next card from the hopper 35 and simultaneously release the card at the sensing station 32 and advance it to the conveyor system 34 to be advanced thereby toward the copying station 33.

The mechanism intermittently to advance such cards from the hopper 35 to the conveyor 34 and to retain the cards at the sensing station is well known and of conventional type, such as that used on Remington Rand Sorting Unit, and will not be further described. This mechanism is shown diagrammatically at 30 in Fig. 2.

The means 30 for advancing the cards from the hopper 35 to the sensing station 32, is so timed, that each card at the sensing station 32 will be restrained for a short interval of time, say in the order of .15 second and the speed of movement of the conveyor system 34 and rate of discharge of the cards into the copying station 33 is such that in the illustrative embodiment herein shown, two cards will always intervene between the card at the sensing station and that at the copying station.

Means are desirably provided to restrain movement of the card for a short interval of time when it arrives at the copying station 33 and to release the card before the next card reaches such station. To this end, as shown in Figs. 1 and 2, a gate 36 is provided at the exit of the copying station 33 and desirably comprises a bar 37 extending at right angles to and normally blocking the movement of the card at station 33. Bar 37 is pivotally mounted so that it may be released by actuation of a solenoid 38, desirably controlled from the card next in sequence to that at the copying station, preferably by the agency of a photoelectric cell 39 of conventional type. Photoelectric cell 39 is mounted on the feeding unit 31 and so positioned that when the conveyor 34 advances the next card toward the copying station 33, such card will cut off the ray of light from a suitable source 41 to the photoelectric cell and the de-energized photoelectric cell will, through conventional control circuits, cause or permit solenoid 38 to lower the gate 36 so that the conveyor 34 will advance past the copying station 33 the card presently thereat. The solenoid 38 will be energized when the photoelectric cell is again subjected to light from source 41 by advance of the second card away from source 41 so that gate 36 will be raised to block further movement of such second card when it reaches the copying station.

The feeding unit 31 desirably has two collecting hoppers 42 and 43 after the copying station 33, positioned one after the other along the conveyor 34. The hopper 42 is designed to receive the "reject" subscription cards, that is, those which have an expiration date thereon to which the machine is set in the manner hereinafter described and the hopper 43 is designed to receive all of the other cards, i.e., subscription and town index cards.

A pivoted cover 45 which extends at right angles to the path of movement of the cards and normally lies over the mouth 46 of the hopper 42 affords a bed over which the cards discharged from the copying station 33 are moved by the conveyor 34 toward the second collecting hopper 43. The cover 45 is controlled by a solenoid 47 which, when energized in the manner hereinafter described, will pivot the cover 45 upwardly to open the mouth of and direct the card to fall into the reject hopper 42.

*Sensing station*

At station 32 the coded information on the two rows of the subscription and town index cards 21 and 22 is sensed to control the desired functioning of the system.

In the illustrative embodiment of the invention, the sensing means desirably comprises a television camera 51 (Figs. 1 and 2) of suitable conventional type such as the image orthicon put out by General Electric Company under Model 4PE 1B1. The camera 51 is suitably mounted with its axis vertical, say on the frame of the feeding unit 31, so that the lens 52 of the camera will view and pick up the information or data coded on both rows of each card.

The otherwise standard camera 51 is desirably modified essentially by removing the horizontal sweep and blanking circuits and using only the vertical deflection yoke and associated circuits and mounting the camera tube displaced 90 degrees about its axis, so that its electronic beam will sweep horizontally.

Means are provided to deflect such electronic sweep beam so that the camera will successively scan a plurality of rows, illustratively the two rows 24 and 25 to pick up the coded information on each of the cards passing through the system.

Although the electronic sweep beam may be deflected in any suitable manner so that it will scan two rows, in the illustrative embodiment herein shown, the drive motor M of the feeding unit 31 which operates the advancing mechanism 30 and conveyor 34, desirably rotates a contact wheel 53 (Fig. 2) which an arcuate contact 54 thereon which may be engaged by a wiper arm 55. The contact 54 is connected through a suitable slip ring connection to B+ and the wiper arm 55 is connected by a lead 57 through coil 58 of relay 59 to ground. The relay 59 has a movable arm 62 normally engaging fixed contact 63 and spaced from fixed contact 64. Contacts 63 and 64 are connected by leads 65, 66 to the movable arms 67, 68 respectively of a pair of potentiometers 69 and 71, the ends of which are connected to B+ and to ground.

The potentiometers are desirably center tapped and connected together by lead 72 to terminal 73 on a terminal strip 74, said terminal being connected by lead 75 to one side of the deflection coil 76 in camera 51 (Fig. 1). The other side of coil 76 is connected by lead 77 to terminal 78 on terminal strip 74 (Fig. 2) to which movable arm 62 of relay 59 is connected. The potentiometers are so adjusted that the D.C. potential from potentiometer 69 for example, will cause coil 76 to center the electronic beam on row 24 or 24a of the cards, while potentiometer 71 will similarly cause the electronic beam to be centered on row 25 or 25a of the cards.

Thus, for example, the electronic beam from the camera will sweep back and forth along the top row 24 of the code on the subscription card 21 when contact arm 62 engages fixed contact 63, at the frequency of the sweep generator in the camera 51. After a given period of time the contact wheel 53 will have rotated so that the arcuate contact 54 thereon is engaged by wiper arm 55 to energize relay coil 58 thereby switching contact arm 62 to fixed contact 64 to change the D.C. potential on coil 76 so that the electronic beam will be deflected downwardly to sweep back and forth along the second row 25. After a second given period of time, the arcuate segment 54 will move away from the wiper arm 55 so that the sweep will return to the beginning of the first row for the next cycle of operation. It is of course to be understood that it is within the scope of the invention to scan any number of rows to the limit of the tube by changing the D.C. potential on coil 76.

The sweep circuit in the camera 51 is desirably connected by a lead 81 (Fig. 1) to a conventional square wave generator 82 which desirably has a pulse repetition frequency of 60 cycles per second (hereinafter designated c.p.s.).

The length of the sweep of camera 51 illustratively four inches, is desirably somewhat less than the length of the card. As the sweep repetition frequency is 60 c.p.s., the duration of each sweep is 16,666 μsec. As there are thirteen (13) bar regions on row 24 of the subscription card 21, there is available a width of 4/13 inch for each bar, which is equal to 1,282 μsec. The width of each bar being preferably only about 100 μsec., the space between consecutive bars on a card is many times the width of the bar.

The output of the television camera 51 is in the form of pulses in the lead 83 which is connected to the input of a conventional pulse amplifier and shaper unit 84. The pulses will be spaced in time, corresponding to the distance between the bars. Thus, if there is a bar at the first region on the card and the next bar is at the fourth region, the pulses corresponding to these bars, which are spaced 12/13 of an inch apart, will have a time interval therebetween of about 3,800 μsec.

The output of the pulse amplifier and shaper unit 84, which is substantially a series of square waves having an amplitude of say 75 volts spaced in the same manner as the pulses fed thereto, is connected by lead 86 to the movable contact arm 87 of relay 59 (Fig. 2) which is ganged to move in unison with contact arm 62. Arm 87 normally engages fixed contact 88 and is spaced from fixed contact 89 and is controlled by the energization of coil 58 of relay 59 when arcuate contact 54 on wheel 53 engages wiper arm 55. Fixed contacts 88 and 89 are connected respectively by leads 91 and 92 to the input terminals 93 of date code converter unit 95 and postal zone converter unit 96. Thus, when the electronic beam of camera 51 is scanning the top row, the output of amplifier 84 will be connected to unit 95 and when the bottom row is being scanned, the output of amplifier 84 will be connected to unit 96.

Means are desirably provided to cut off the output of camera 51 when a card is in movement therepast. Such means desirably comprises a contact wheel 97 (Fig. 2) also driven by motor M, which has an arcuate contact 98 thereon so positioned, that while the advancing means 30, shown in Fig. 2, is moving to advance a card, the arcuate contact 98 which has a connection by way of lead 99 from lead 86 (Fig. 1), will be engaged by wiper arm 101 (Fig. 2) to ground, thereby to by-pass the impulses from the camera 51 so that they will have no effect.

The output of square wave generator 82 is also fed by lead 104 (Fig. 1) to the inputs of identical pulse amplifiers 105 and 106 which increases the amplitude of the square wave fed thereto to say 150 volts peak to peak. The outputs of amplifiers 105 and 106 are connected by leads 107 and 108 respectively to identical differentiator units 109 and 111. Each differentiator unit includes a capacitor 112, one side of which is connected to the associated lead 107, 108 and the other side of which is connected through lead 113 and resistor 114 to ground.

As a result of such differentiators 109 and 111, the 60 c.p.s. square wave output of the amplifiers 105 and 106 will be transformed into negative and positive pulses, the peak of adjacent negative pulses occurring at the same frequency. The leads 113 of each of the differentiator units is connected to the plate 115 of a diode clipper tube 116, the cathode 117 of which is connected to ground. By reason of such diode clippers, the positive pulses of the differentiated square wave will be by-passed to ground and only the negative pulses which occur at 60 c.p.s. will pass through lead 113, coupling capacitor 118 in series therewith to the input terminals 119 of the date code converter unit 95 and postal zone converter unit 96 respectively.

*Converter units*

As the date code converter unit 95 and postal zone converter unit 96 are substantially identical except for the number of circuit components, only the former will be described in detail.

The converter unit 95 shown in detail in Fig. 3 desirably comprises a line of identical multi-vibrators 125, illustratively 13 in number for the date code converter unit 95 and six in number for the postal zone converter unit 96. Each multi-vibrator, which is of the conventional "single shot" type, desirably comprises a pair of vacuum tubes 126 and 127, illustratively triodes as shown.

The grid 128 of tube 126 is desirably connected by lead 129 through capacitor 131 to the plate 132 of tube 127 and the grid 133 of tube 127 is desirably connected by lead 134 through capacitor 135 to the plate 136 of tube 126. Each of the plates 132 and 136 desirably has a plate load resistor 137 in series therewith and connected to the B+ supply. The grid 133 of tube 127 is connected by lead 138 through resistance 139 to the B+ supply and by lead 141 to input terminal 119. The cathode 142 of each tube 126, 127 is connected to ground and the plate 132 of tube 127 is connected by lead 143 to one side of capacitor 144 of differentiator unit 145, the other side of said capacitor being connected through resistor 146 to ground and by lead 147 to the plate 148 of a diode clipper tube 149, the cathode 151 of which is connected to ground. The lead 147 is also connected through coupling capacitor 152 to the grid 133 of tube 127 of the second multi-vibrator 125 in the line. The grid 128 of tube 126 of each multi-vibrator 125 is connected through resistance 153 to a source of negative potential in the order of say 50 volts.

The circuits above described are repeated for the entire thirteen multi-vibrators in the date code converter unit 95 and the six multi-vibrators in the postal zone converter unit 96.

The grid 128 of each of tubes 126 of each of the multi-vibrators 125 is connected by an associated lead 157 through a coupling capacitor 158 to the control grid 159 of a coincidence gate tube 161, thirteen of such tubes being provided in the date code converter unit 95 and six such tubes in the postal zone converter 96. The signal taken from grid 128 will also be a positive pulse having a time duration equal to that of the cycle of the multi-vibrator which is illustratively set at 1,200 μsec.

Each of the gate tubes 161 is desirably a pentode, having in addition to control grid 159, a screen grid 162 which is connected through resistance 163 to ground to which the cathode 164 is also connected. The plate 165 of each tube 161 is connected through resistance 166 to B+ and the B+ source is connected through resistance 167 to screen grid 162. The control grid 159 is connected to a negative potential of say 30 volts through a resistance 168 and the suppressor grid 169 is also connected to such negative potential of 30 volts through a resistance 170. The suppressor grid 169 of each tube 161 is connected through a coupling capacitor 172 and lead 173 to a common main 174 which is connected to input terminal 93 of the date code converter unit 95 and postal zone converter unit 96 respectively.

As leads 91 and 92 from fixed contacts 88 and 89 of relay 59 (Fig. 2) are connected to terminals 93 of units 95 and 96 respectively, depending upon the position of contact arm 87 of such relay, the coded pulses picked up by the camera 51 may be applied simultaneously to all of said suppressor grids 169 of either the date code converter unit 95 or the postal zone converter unit 96.

The gate tubes 161 are so biased that they are ordinarily non-conducting and it requires the simultaneous application of the positive 1,200 μsec duration pulse from the grid 128 of the associated multi-vibrator, which has an amplitude of say 75 volts, and a positive pulse of 100 μsec duration from the amplifier 84, which also has an amplitude of 75 volts through contact arm 87 (Fig. 2) and either fixed contact 88 or 89, to cause the gate tubes to conduct.

The output of each gate tube 161 is taken from the plate 165 thereof which is connected by lead 181 through coupling capacitor 182 to an associated conventional amplifier inverter 183 which changes the negative 100 μsec pulse of say, 75 volts amplitude from the plate 165 of tube 161 to a positive pulse.

The output of each inverter 183, thirteen of which are provided in unit 95 and six in unit 96, is connected by lead 184 through coupling capacitor 185 to the control grid 186 of an associated thyratron tube 187 which is of conventional type having a negative potential of say 50 volts applied to the control grid 186 through a resistor 188. The plates 189 of the several thyratrons, are desirably connected together by common lead 190 to terminal 191 of each unit 95, 96 respectively.

The terminal 191 of date code converter unit 95 is connected by lead 192 (Fig. 1) to movable arm 193 (Fig. 2) of a relay 194, said arm normally engaging fixed contact 195 connected to the B+ supply when the coil 196 of the relay is not energized. One end of coil 196 is connected to ground and the other end to wiper arm 197 which is adapted to engage an arcuate contact 198 on contact wheel 199 also driven by motor M. The contact 198 is connected to the B+ supply and is so positioned that it will be engaged by wiper arm 197 to energize relay 194 just before the card in the hopper 35 is advanced by the advancing mechanism 30. As a result, the circuit to the plates 189 of all thirteen thyratrons 187 in date code converter unit 95 will momentarily be broken to recycle the thyratrons.

The cathode 201 of each thyratron (Fig. 3) is connected to ground through series connected resistance 202 and coil 203 of a relay 204, the coil controlling a movable arm 205 which is connected to B+ and normally spaced from fixed contact 206 when the coil 203 is not energized. In the embodiment herein, thirteen relays are provided in unit 95 and six in unit 96.

With the circuit above described, whenever one of the gate tubes 161 conducts, the associated thyratron 187 will also conduct. Thus, during one sweep of the camera over the four inches of coded area on the two rows of the cards, those thyratrons 187 will be made to conduct which correspond to the position of the bars on the card. Thus, if there are bars at regions 1 and 5, on row 24 of card 21, the first and fifth thyratrons of unit 95 will conduct and the bar at region 1 on row 25 of card 21 will cause the first thyratron of unit 96 to conduct.

As it is a characteristic of a thyratron that once it conducts, it will remain conducting until the B+ supply to the plate is cut off, regardless of the signal applied to the control grid, even though the camera 51 should sweep the coded rows several times while the card is at rest position at sensing station 32, the subsequent actions of the multi-vibrators 125 and the gate tubes 161 will have no effect upon the selected thyratrons which will remain conducting.

The fixed contacts 206 of each of the relays associated with the thyratrons 187 of each of the units 95 and 96 are connected respectively by leads 207 to corresponding terminals 208 on terminal strip 209.

As shown in Fig. 1, the terminal strip 209 of the date code converter unit 95 has thirteen terminals designated 1 to 13 and the terminal strip 209 of the postal zone converter unit 96 has six terminals designated 1 to 6. The terminals 1 to 12 of the unit 95 are connected by leads 211 to terminals 1 to 12 respectively on a terminal strip 212 of a date decoder unit 213; the terminals 2, 3, 4 and 5 of unit 96 are connected by leads 210 to terminals 1, 2, 3 and 4 respectively on terminal strip 218 of a postal zone decoder unit 219.

The terminal 13 on terminal strip 209 of unit 95 is connected by lead 175 to one side of coil 176 of relay 177 (Fig. 1), the other side of which is connected to B+. The relay 177 which controls the thyratrons in the postal zone converter unit 96 has a movable arm 178 connected to B+ and normally engaging fixed contact 179 connected by lead 180 to input terminal 191 of unit 96 to which the plates of the six thyratrons in unit 96 are connected. Thus, upon energization of relay 177 in the manner hereinafter described, the circuit from B+ to the six thyratrons in the unit 96 will be broken to recycle such unit 96.

The terminal 1 on terminal strip 209 of unit 96 is connected by leads 221 and 335 to the input 336 of a conventional inverter amplifier 337 (Fig. 13) which inverts the positive pulse applied to the grid 338 of tube 339 so that a negative pulse will be applied from the plate 340 to the grid 133' of tube 127' of a multi-vibrator 125' identical to the multi-vibrator 125 shown in Fig. 3 and having the same reference numerals primed. As a result of the interposition of the inverter multi-vibrator unit 278 in line 335, a positive pulse of predetermined duration is delivered from the plate 132' of tube 127' through output 279 and lead 230 to movable contact arm 226 (Fig. 1) of relay 217 which is normally engaging fixed contact 220 when the coil 123 of said relay, connected by lead 124 to terminal 327 of manual selector unit 265, is not energized. Fixed contact 220 of relay 217 is connected by lead 222 to terminal 227 on terminal strip 228 of mailing classifier unit 229. Terminal 1 of unit 96 is also connected by leads 221 and 280 to terminal 233 on terminal strip 224 of delay unit 225, and by way of said lead 221 to one side of counter 309, preferably an electromagnetic counter of conventional type, the other side of which is connected to ground.

The terminal 6 on terminal strip 209 of unit 96 is connected by leads 231 and 232 to terminal 334 on terminal strip 224 of delay signal unit 225 and by said lead 231 to the input 336 on inverter-multi-vibrator unit 278, the output 279 of which is connected by lead 234 to terminal 235 on terminal strip 228 of mailing classifier unit 229.

As the date decoder unit 213 and postal zone decoder unit 219 are substantially identical, only the former will be described in detail.

*Decoder unit*

The date code-decoder unit 213 shown in detail in Fig. 4, desirably comprises three banks of relays 241, 242 and 243, each bank having four relays designated A to D respectively, the relays A, B, C, D of bank 241 determining the month; the relays A, B, C, D of bank 242 the decade and the relays A, B, C, D of bank 243 the year.

Each of the twelve relays has a coil 238, one end of which is connected by common main 239 to ground. The other ends of the coils 238 of relays 241 A to D, 242 A to D and 243 A to D are connected respectively by leads 240 to the terminals 1 to 12 on terminal strip 212 of the date code converter unit 213.

Each relay A, B, C, D of bank 241 controls 12 arms 244–a to 244–l ganged together to move in unison and each relay A, B, C, D of banks 242 and 243 controls 10 arms 244–a to 244–j, also ganged together to move in unison.

The arms 244 of the relays A, B, C, D of bank 241 are so positioned with respect to their associated fixed contacts 245–a to 245–l, that depending upon the relay or relays actuated, any one of twelve distinct circuits may be completed. Similarly, the movable arms 244 of the relays of banks 242 and 243 are so positioned with respect to their associated fixed contacts 245–a to 245–j that depending upon the relay or relays in each bank that are actuated, any one of ten distinct circuits may be completed in each bank.

Thus, for example, the arms 244–a, e, h, j and k controlled by relay 241A are normally spaced from the associated fixed contacts 245–a, e, h, j and k and the remaining arms 244 normally engage the associated fixed contacts. The arms 244–b, e, f, i, k and l controlled by relay 241B are normally spaced from the associated fixed contacts 245–b, e, f, i, k and l and the remaining arms 244 normally engage the associated fixed contacts. The arms 244–c, f, g, h, k and l controlled by relay 241C are normally spaced from the associated fixed contacts 245–c, f, g, h, k and l and the remaining arms 244 normally engage the associated fixed contacts. The arms 244–d, g, i, j and l controlled by relay 241D are normally spaced from the associated fixed contacts 245–d, g, i, j and l and the remaining arms 244 normally engage the associated fixed contacts.

The arms 244 of relays 241B and C at each position are desirably connected together and the fixed contacts 245 of relays 241A, B, and C, D at each position are connected together respectively. The arm 244 of relay 241A at each position is connected to common main 248 which in turn is connected to B+ and the arm 244 of relay 241D at each position is connected by leads 249 respectively to an associated terminal a to l on terminal strip 251.

Thus, there are twelve possible series circuits which may be completed from B+ to one of the twelve terminals a to l on strip 251. For example, if relay 241A is energized in the manner hereinafter to be described, the only series circuit that will be completed will be at position a. If relays 241A and D should be energized the only series circuit that will be completed will be at position j of the relays. Thus, by various combinations of relays 241A, B, C and D any one of at least twelve circuits can be completed.

As the construction and operation of the relay banks 242 and 243 are identical to that of relay bank 241 they will not be described. The ten outputs of each of the relay banks 242 and 243 are connected respectively by leads 252 and 253 to ten terminals a to j on each of the terminal strips 254 and 255.

The postal zone decoder unit 219 which is identical to relay bank 241, except that its common main 248 is connected to ground, has its twelve outputs connected respectively by leads 249 to twelve terminals A to L on a terminal strip 257.

The terminals a to l, a to j and a to j on terminal strips 251, 154 and 255 of unit 213 are connected respectively by leads 258, 259 and 261 (Fig. 1) to corresponding terminals *a* to *l*, *a* to *j*, and *a* to *j* on terminal strips 262, 263 and 264 on the date setting unit 265 shown in Fig. 5 which will now be described in detail.

*Date setting unit*

The twelve terminals *a* to *l* on terminal strip 262 are connected respectively to one side of the twelve coils of relays 268A to L, the other side of which is connected to ground. Similarly, the ten terminals *a* to *j* on each of the terminal strips 263 and 264 are connected respectively to one side of the ten coils of relays 269A to J and 271A to J, the other sides of which are connected to ground.

In the illustrative embodiment herein shown, each of the relays 268A to L, 269A to J and 271A to J controls eight sets of movable contact arms 272*a* to *h*, 273*a* to *h* and 274*a* to *h* respectively, the contact arms of each of the three groups of eight sets each being ganged to move in unison respectively upon energization of one of the associated relays.

Each set 272*a* to *h* has twelve contact arms and each set 273*a* to *h* and 274*a* to *h* has ten contact arms. Each of the contact arms 272*a* to *h*, 273*a* to *h* and 274*a* to *h* has a corresponding fixed contact 281*a* to *h*, 282*a* to *h* and 283*a* to *h* associated therewith and normally spaced therefrom.

Associated with each of the sets of contacts 272*a* to *h*, 273*a* to *h* and 274*a* to *h* is a manually operated wafer switch 285A to H, 286A to H and 287A to H, respectively. Each wafer switch desirably has a movable contact arm 288, which upon rotation of a knob (not shown) may selectively engage an associated fixed contact 289. Each of the switches 285A to H has twelve fixed contacts corresponding to the months of the year which may be successively engaged by the associated contact arm 288. Each of the switches 286A to H and 287A to H has ten fixed contacts 289 corresponding to the decade and the year respectively.

The twelve fixed contacts 281*a* associated with movable contact arms 272*a* are connected respectively by leads 291 to the twelve fixed contacts 289 corresponding to the months of January to December of the wafer switch 285A. The twelve fixed contacts 281*b* associated with movable contact arms 272*b* are connected respectively by similar leads 291 (not shown) to the twelve fixed contacts 289 of the wafer switches 285B and so on. In like manner, the ten fixed contacts associated with movable contact arms 273*a* to *h* are connected to the ten fixed contacts 289 of wafer switches 286A to H and 287A to H respectively.

The movable contact arms 272*a* to *h* are connected respectively by common leads 292, 293, 294, 295, 296, 297, 298 and 299 to movable arms 288 of wafer switches 286A to H. The movable contact arms 273*a* to *h* are connected respectively by common leads 301, 302, 303, 304, 305, 306, 307 and 308 to movable arms 288 of wafer switches 287A to H. The movable arms 274*a* to *h* are connected respectively by common leads 311, 312, 313, 314, 315, 316, 317 and 318 to B+.

The movable arm 288 of the wafer switch 285A is desirably connected by lead 319 to terminal 321 on a terminal strip 322. The movable arms 288 of switches 285B, C and D are desirably connected through switches 300′ and by lead 324 to terminal 325 on strip 322. Movable arms 288 of switches 285E, F and G are desirably connected by lead 326 to terminal 327 on strip 322 and the movable arm 288 of the switch 285 H is connected by lead 328 to terminal 329 on strip 322.

The terminals 321, 325, 327 and 329 are connected respectively by suitable leads 331 (Fig. 1) to terminals 333, 332, 237 and 223 on terminal strip 224 of the delay signal unit 225 shown in Fig. 6 which will now be described in detail.

*Delay signal unit*

The delay signal units shown in Fig. 6 desirably comprises a plurality of memory units or banks, illustratively five in number designated 341, 342, 343, 344 and 345, each bank having eight relays 346, 347, 348, 349, 350, 351, 352 and 353.

Each of the relays 346 to 351 has a coil 355 which controls three movable arms 356, 357 and 358, the arms 356 and 358 being normally spaced from an associated fixed contact 359 and 361 respectively and the arm 357 which is connected to B+, being normally spaced from a movable contact arm 362 when the coil 355 of the relay is not energized. Arm 362 normally engages a fixed contact 363 and is moved away therefrom by arm 357 when coil 355 is energized.

The relay 352 of each bank has six movable contact arms 365, 366, 367, 368, 369 and 370, normally spaced from and brought into engagement with associated fixed contacts 372, 373, 374, 375, 376 and 377 when the coil 378 of relay 352 is energized. The relay 353 of each bank has a single movable contact arm 379 normally engaging fixed contact 381 and displaced therefrom when coil 382 of relay 353 is energized.

The fixed contacts 363 of each set of relays 346 to 351 are connected to common mains 383, 384, 385, 386, 387 and 388 respectively, one end of each of said mains being connected to terminals 332, 333, 237, 334, 223 and 233 respectively, designated "pre-expire," "expire," "non-print," "town index," "reject" and "count" respectively, said terminals being mounted upon terminal strip 224. The movable arm 362 of each of the relays 346 to 351 is connected to one end of the associated coil 355. The other end of each of said coils 355 is connected by lead 389 to the fixed contact 361 of such relay.

Fixed contacts 361 of relays 346 to 351 of each of said banks are connected by leads 391, 392, 393, 394, 395, 396 respectively to movable arms 370, 369, 368, 367, 366 and 365 of relay 352. The fixed contacts 372 to 377 of relay 352 and the movable arms 358 of relays 346 to 351 of each bank are connected to common main 397, which is connected to fixed contact 381 which is normally engaged by movable arm 379 connected to ground and to one side of coil 382 of relay 353. The other side of coil 382 of each bank 341 to 345 is connected to terminal 401 on a corresponding terminal strip 402.

The movable arms 356 of each set of relays 346, 347, 348 and 349 are connected to common mains 403, 404, 405 and 406 respectively, one end of each of which is connected to a terminal 451, 452, 453 and 454 on terminal strip 457 designated "pre-expire," "expire," "non-print" and "town index" respectively.

The fixed contacts 359 of relays 346, 347, 348 and 349 of each of the banks are connected to common main 407 which is connected to terminal 408 on the corresponding terminal strip 402.

Movable arms 356 of relays 350 and 351 of each of said banks are connected by leads 412 and 413 respectively to terminals 414 and 415 on the corresponding terminal strip 402 and the remaining terminal 416 is connected by lead 417 to one side of the coil 378 of relay 352, the other side of which is connected to ground.

Fixed contacts 359 of the set of relays 350 are connected to common lead 419 which is connected at one end to terminal 455 on terminal strip 457 and designated "reject" and fixed contacts 359 of the set of relays 351 are connected to common lead 422 which is connected at one end to terminal 456 on terminal strip 457 and designated "count."

Associated with the respective relay banks 341 to 345 are the five sections 423, 424, 425, 426 and 427 of stepping switch 428 (Fig. 2). Each section of switch 428 desirably has five fixed contacts 429, 430, 431, 432 and 433 and a movable contact arm 434 designed successively to engage the contacts of the corresponding section upon energization of coil 435 of the stepping switch 428. The arms 434 which move in unison, are connected to common main 436 which in turn is connected to B+.

Contact 429 of sections 423 to 427 is connected by lead 437, 438, 439, 440 and 441 respectively, to terminal 416 on strip 402 of bank 341 (Figs. 2 and 6), to terminals 408, 415 and 414 respectively on terminal strip 402 of bank 343 and to terminal 401 on terminal strip 402 of bank 342.

Contact 430 of each section is connected by leads 442, 443, 444, 445 and 446, to terminal 416 on terminal strip 402 of banks 342; to terminals 408, 415 and 414 respectively on terminal strip 402 of bank 344 and to terminal 401 on terminal strip 402 of bank 343.

Contact 431 of each section is connected by lead 458, 459, 460, 461 and 462 to terminal 416 on terminal strip 402 of bank 343; to terminals 408, 415 and 414 respectively on terminal strip 402 of bank 345 and to terminal 401 on terminal strip 402 of bank 344.

Contact 432 of each section is connected by lead 463, 464, 465, 466 and 467 to terminal 416 on terminal strip 402 of bank 344; to terminals 408, 415 and 414 on terminal strip 402 of bank 341 and to terminal 401 on terminal strip 402 of bank 345.

Contact 433 of each section is connected by leads 468, 469, 470, 471 and 472 to terminal 416 on terminal strip 402 of bank 345; to terminals 408, 415 and 414 of terminal strip 402 of bank 342 and to terminal 401 on terminal strip 402 of bank 341.

As shown in Fig. 2, one end of coil 435 of stepping switch 428 is connected to ground and the other end is connected by lead 473 to movable contact arm 474 of relay 475. Arm 474 is normally spaced from fixed contact 476 and ganged to move in unison with movable arm 477 when coil 478 of said relay is de-energized. Coil 478 is connected between ground and the photoelectric cell 479, so that when the light source 480 is interrupted by a card at copying station 33, the relay is de-energized.

Movable arm 477 normally engages fixed contact 481 of relay 475 when coil 478 is energized and is connected by lead 482 to fixed contact 483 of relay 484. Contact 483 is normally engaged by movable arm 485 of relay 484 when coil 486 is energized. Coil 486 is connected by lead 487 between ground and photoelectric cell 488 so that when light from source 489 is interrupted by a card at the sensing station 32, relay 484 is de-energized.

Fixed contact 481 of relay 475 is connected to one end of coil 490 of relay 491, the other end being connected to ground. Movable arm 492 of relay 491 is connected to B+ and engages fixed contact 493 in the normal or de-energized state of coil 490. Fixed contact 493 is connected by lead 494 to grounded motor M.

Fixed contact 476 of relay 475 is connected by lead 495 to wiper arm 496 associated with contact wheel 497 driven by motor M. Wheel 497 has an arcuate contact strip 498 connected to B+ and adapted to be engaged by wiper arm 496 during the sweep of the two rows on the cards. Wiper arm 496 is connected by lead 499 to movable arm 485 of relay 484 which is spaced from fixed contact 500 of the normally energized relay 484. Contact 500 is connected by lead 501 to movable arm 474 of relay 475.

*Mailing classifier*

The mailing classifier unit 229 shown in Fig. 7 desirably comprises a plurality of relays 506, 507, 508, 509 and 510, each having four movable contact arms 511, 512, 513 and 514 ganged together to move in unison, of which arms 511 and 512 normally engage associated fixed contacts 515, 516 and arms 513 and 514 are spaced from associated fixed contacts 517, 518 respectively, the movable arm 511 also being spaced from a second associated fixed contact 519 which is connected to B+.

One end of the coil 521 of each of the relays 506 to 510 is connected to the associated movable arm 511 and coil 521 of relay 506 is also connected to fixed contact 522 of pushbutton switch 523, the movable arm 524 of which is connected to B+. The other end of the coil 521 of relay 506 is connected by lead 525 to movable arm 512 of relay 510 and the fixed contacts 516 of relays 506 to 510 are connected by common main 526 to ground.

The other end of the coil 521 of relay 510 is connected by lead 527 to movable arm 512 of relay 509; the other end of the coil 521 of relay 509 is connected by lead 528 to movable arm 512 of relay 508; the other end of the coil 521 of relay 508 is connected by lead 529 to movable arm 512 of relay 507 and the other end of the coil 521 of relay 507 is connected by lead 531 to movable arm 512 of relay 506.

The fixed contacts 517 of the relays 506 to 510 are connected by common main 532 to terminal 235 on terminal strip 228 of the mailing selector unit 229. The movable arm 513 of relay 510 is connected by lead 533 to fixed contact 515 of relay 509; the movable arm 513 of relay 509 is connected by lead 534 to fixed contact 515 of relay 508; the movable arm 513 of relay 508 is connected by lead 535 to fixed contact 515 of relay 507; the movable arm 513 of relay 507 is connected by lead 536 to fixed contact 515 of relay 506 and the movable arm 513 of relay 506 is connected by lead 537 to fixed contact 515 of relay 510.

The fixed contacts 518 of relays 506 to 510 are connected by common main 538 to terminal 227 on terminal strip 228. The movable arm 514 of each of the relays 506 to 510 is connected to the inputs 539 of identical relay counting units 541, 542, 543, 544 and 545 respectively. Each relay counting unit desirably comprises four relays 546, 547, 548 and 549, each having a coil 551, 552, 553 and 554 respectively.

Each relay 546, has three movable arms 555, 556 and 557 ganged together to move in unison. Each of arms 555 and 556 has a fixed contact 558 and 559 respectively from which it is normally spaced. The arm 557 normally engages an associated fixed contact 561 and is spaced from an associated fixed contact 562 connected to B+.

Relay 547 has two movable arms 563 and 564 ganged together to move in unison. The arm 563 is normally spaced from fixed contact 565 and the arm 564 normally engages fixed contact 566 and is spaced from fixed contact 567 connected to B+.

Relay 548 has two movable arms 569 and 571 which normally engage fixed contacts 572 and 573 respectively. Arm 571 also has a second fixed contact 574 normally spaced therefrom and connected to B+. Relay 549 has a movable arm 575 connected to ground and normally engaging fixed contact 576.

Input 539 of each of the relay counting units 541 to 545 is connected by lead 577 to fixed contact 561 of relay 546 and by lead 578 to movable arm 555 of said relay 546 and to movable arm 563 of relay 547.

The fixed contacts 559 of relays 546 are connected by common main 581 to terminal 582 on terminal strip 228. One end of the coils 551, 552 and 553 of relays 546, 547 and 548 is connected to the associated movable arm 557, 564 and 571. The other ends of the coils 551 and 552 of relays 546 and 547 are connected by lead 583 to fixed contact 572 of relay 548, the movable arm 569 of which is connected by lead 584 to the other end of the coil 553 of said relay 548 and by lead 585 to fixed contact 576 of relay 549. Fixed contact 558 of relay 546 is connected by lead 586 to fixed contact 566 of relay 547 and fixed contact 565 of relay 547 is connected by lead 587 to fixed contact 573 of relay 548.

The mailing classifier unit also includes five additional relays 591, 592, 593, 594 and 595, each having five movable arms 596, 597, 598, 599 and 600, ganged together to move in unison. Arms 597, 598 normally engage associated fixed contacts 601 and 602 and arms 596, 599 and 600 are spaced from fixed contacts 603, 604 and 605 respectively, the movable arm 597 also being spaced from fixed contact 606 which is connected to B+.

One end of the coils 607 of each of the relays 591 to 595 is connected to the associated movable arm 597 and such end of the coil 607 of relay 591 is also connected to fixed contact 608 of switch 609, the movable arm 611 of which is connected to B+. The other end of the coil 607 of relay 591 is connected by lead 612 to fixed contact 602 of relay 595, and the movable arms 598 of relays 591 to 595 are connected by common main 613 to ground.

The other end of the coil 607 of relay 595 is connected by lead 614 to fixed contact 602 of relay 594; the other end of the coil 607 of relay 594 is connected by lead 615 to fixed contact 602 of relay 593; the other end of the coil 607 of relay 593 is connected by lead 616 to fixed contact 602 of relay 592 and the other end of the coil 607 of relay 592 is connected by lead 617 to fixed contact 602 of relay 591.

The fixed contact 603 of relay 595 is connected by lead 618 to fixed contact 601 of relay 594 and by lead 619 to movable arm 600 of said relay 594. The fixed contact 603 of relay 594 is connected by lead 621 to fixed contact 601 of relay 593 and by lead 622 to movable arm 600 of said relay 593. The fixed contact 603 of relay 593 is connected by lead 623 to fixed contact 601 of relay 592 and by lead 624 to movable arm 600 of said relay 593. The fixed contact 603 of relay 592 is connected by lead 625 to fixed contact 601 of relay 591 and by lead 626 to movable arm 600 of said relay 591 and the fixed contact 603 of relay 591 is connected by lead 627 to fixed contact 601 of relay 595 and by lead 628 to movable arm 600 of said relay 595.

The movable arm 596 of relays 591 to 595 are connected by common main 629 to terminal 631 on terminal strip 228 and the movable arm 599 of relays 591 to 595 are connected by common main 632 to terminal 633 on terminal strip 228.

The fixed contact 605 of relay 595 is connected by lead 634 to one end of the coil 554 of relay 549 of counting unit 541, the other end of which is connected to ground. The fixed contacts 605 of relays 594, 593, 592 and 591 are connected by leads 635, 636, 637 and 638 respectively to one end of the coils 554 of relays 549 of counting units 545, 544, 543 and 542 respectively, the other ends of said coils being connected to ground.

To complete the circuit for the mailing classifier unit, the fixed contacts 604 of each of the relays 591, 592, 593, 594 and 595 are connected respectively by leads 639, 640, 641, 642 and 643 to movable arms 556 of relay 546 of counting units 541, 542, 543, 544 and 545 respectively.

*Copying station*

Positioned at station 33 (Fig. 1) is a second video camera 647 which may be of conventional type such as that put out by Radio Corporation of America under designation ITV1. Camera 647 has a raster scan designed to pick up the subscription data, typewritten or otherwise recorded on the subscription card 21, for example the name and address and the date of expiration of the subscription as well as any other information that may be thereon. Camera 647 desirably secures its vertical synchronization pulse for the vertical sweep generator in the camera from the output of square wave generator 82 through lead 648 and blanking impulses are also sent from said square wave generator to the video camera through a second lead 649. Both pulses are 60 c.p.s. and 660 μsec in width. The horizontal synchronization pulses for the horizontal sweep generator in camera 647 are sent through lead 651 from a second square wave generator 652 of conventional type which illustratively delivers square waves having a 10 μsec time duration at a PRF at 15.75 kc.

The output of the video camera 647, desirably video signals resulting from data which has been scanned by a raster of 525 lines, is fed through a coupling capacitor 653 to the grid 654 of a cathode follower 655, which grid is connected to ground through a resistor 656 of relatively high value. The output of the cathode follower 655 is taken from the cathode 657 thereof and connected by lead 658 to fixed contact 659 of non-print relay 661, the arm 662 of which engages said fixed contact with the coil 663 of said relay normally not energized and is connected by lead 664 to terminal 665 on terminal strip 666 of imprinting unit 667 shown in Fig. 8.

*Imprinting unit*

The imprinting unit shown in Fig. 8 desirably comprises a plurality of recorders such as imprinting devices, desirably video or television monitor receivers 679, 681, 682, 693 and 694 of substantially conventional type such as that put out by Radio Corporation of America. The input of each of said receivers 679, 681 and 682 is connected by lead 675 to common main 676 which is connected to terminal 665 on terminal strip 666. Common main 676 is also connected by lead 683 to arm 684 of switching relay 685, said arm normally engaging a fixed contact 686 and being spaced from a fixed contact 687. The fixed contacts 686 and 687 are connected respectively to the inputs of receivers 693 and 694 respectively.

Each television monitor receiver desirably has its vertical sweep generator and horizontal sweep generator connected by leads 702 and 703 (Fig. 8) respectively to common mains 704 and 705, which in turn are connected to terminals 706 and 707 on terminal strip 666. Terminals 706 and 707 are connected respectively by leads 708 and 709 (Fig. 1) to square wave generator 82 and 652, so that vertical synchronization pulses of 60 c.p.s. will be delivered to the vertical sweep generator and horizontal synchronization pulses of 15,750 c.p.s. will be delivered to the horizontal sweep generator.

Each of the receivers 679, 681, 693, 694 and 682 which desirably is positioned in a light-tight chamber 711 is normally biased in conventional manner so that it is non-conducting. Consequently, no light will be projected from the receiver lens 712 onto an associated sensitized paper strip 713 (Fig. 9) mounted on spools 714 and 715 and also positioned in the associated light-tight chamber 711.

The biasing resistor (not shown) in each receiver is desirably connected by an associated lead 716 to the arm 717 of an associated relay 718, 719, 721, 722 and 723, said arms 717 being spaced from an associated fixed contact 724 connected to B+ when the grounded coil 725 of the relay is not energized. Thus, when the movable arm 717 engages the associated fixed contact 724 in the manner hereinafter described, the negative bias on the associated receiver will be overcome and the tube will conduct for the imprinting operation on the paper strip 713.

If desired, a separate counter could be associated with each receiver and the associated relay could have suitable contacts to complete a circuit to its related counter upon energization of the relay. As the provision of such counters would be readily apparent to one skilled in the art, they have not been shown.

The coils 725 of relays 718 and 719 are desirably connected by leads 726, 727 to terminals 728 and 729 on terminal strip 731. The coil 725 of relay 721 is desirably connected by lead 732 to fixed contact 733 of relay 685 which is engaged by contact arm 734 when the coil 735 of said relay 685 is not energized. Arm 734 is connected by lead 736 to main 737 which is connected to movable arm 781 of switch 782, the associated fixed contact 783 of which is connected to terminal 784 on strip 731. The coil 725 of relay 723 is connected by lead 738 through single pole single throw switch 742 and lead 741 to terminal 784 on strip 731.

The coil 725 of relay 722 is connected by lead 743 to fixed contact 744 of relay 685, the associated movable arm 745 of which is spaced from said contact 744 when the coil 735 of said relay is not energized and is connected by lead 746 to main 737. One side of coil 735 of relay 685 is connected to ground and the other side of said coil is connected by lead 747 to terminal 748 on terminal strip 731. Terminal 748 is connected by lead 749 (Fig.

1), to output 279 of inverter multi-vibrator unit 278, the input 336 of which is connected by lead 787 to terminal 582 of mailing classifier unit 229.

Each of the relays 718, 719, 721, 722 and 723 in addition to movable arm 717 has a second movable arm 758 which is spaced from its fixed contact 759 when the coil 725 of the relay is not energized. The fixed contact 759 is connected to B+ and the movable arm 758 is connected by lead 761 to one side of the coil 762 of an associated solenoid 763, the other side of said coil being connected to ground. The solenoids 763, five of which are provided, associated respectively with each of the rolls of sensitized paper strip 713 are designed to effect advance of the paper strip for a predetermined amount only after information has been projected thereon, thereby assuring that there will be no blank spaces in the imprinted lists.

To this end, as shown in Fig. 9, each of the rollers 714 has a sprocket wheel 764 affixed at the end thereof, which is to be actuated by a ratchet pawl 765 mounted at the end of the plunger 766 to be operated by the coil 762 of the solenoid 763.

The plunger 766 is normally urged to retracted position as by a coil spring 767 affixed at one end thereof, and the pawl 765 is pivotally mounted at the other end of plunger 766 and normally urged against a stop member 768 by a spring 769. Thus, when the coil 762 is energized the plunger 766 will move upwardly as shown in Fig. 9 against the tension of coil spring 767 and the pawl 765, when it strikes the teeth 771 of ratchet wheel 764, will pivot in a clockwise direction away from stop member 768 and ride over said teeth so that the roller 714 will not be rotated. When the coil 762 is de-energized, the coil spring 767 will retract the plunger 766 and the pawl 765 will abut against stop member 768 so that when the pawl strikes the ratchet teeth 771, the roller 714 will be turned sufficiently to advance the paper strip 673 for the next imprinting operation.

Each of the relays 721, 722 and 723, in addition to the movable arms 717 and 758, has a movable arm 791 normally spaced from an associated fixed contact 792 connected to B+. Arms 791 of relays 721 and 722 are connected respectively by leads 793, 794 to terminals 795 and 796 on terminal strip 731. Arm 791 of relay 723 is connected to fixed contact 797 of normally open switch 803 and the movable arm 804 of said switch is connected to terminal 796.

With the delay signal unit 225 above described, when a signal is impressed upon any one of the input terminals on strip 224 due to coded information from a subscription or town index card at sensing station 32, such signal will be conveyed along the appropriate one or more of the delay lines, pre-expire, expire, non-print, town index, reject or count and only when the card reaches the copying station 33 will such signal be impressed upon output terminals 451 to 456 of said delay signal unit 225.

The terminals 451 and 452 of delay unit 225 are connected by leads 447 and 448 (Fig. 1) to the inputs 336 of inverter-multi-vibrator units 278, the outputs 279 of which are connected respectively to terminals 728 and 729 on terminal strip 731 of imprinting unit 667. Terminal 453 of delay unit 225 is connected by lead 449 through coil 663 to ground. Terminal 454 of delay unit 225 is connected by lead 730 to the input 336 of inverter-multivibrator unit 278, the output of which is connected to terminal 631 on terminal strip 228 of mailing classifier unit 229. Terminal 455 of delay unit 225 is connected by lead 398 to the input 336 of inverter-multi-vibrator unit 278 the output 279 of which is connected to one side of the coil of solenoid 47 (Figs. 1 and 2) the other side of said solenoid coil being connected to ground.

Terminal 456 of delay unit 225 is connected by lead 399 to terminal 633 on terminal strip 228 of mailing classifier unit 229 and by lead 400 to the input 336 of inverter-multi-vibrator unit 278, the output 279 of which is connected to fixed contact 502 of non-print relay 661. The movable contact arm 503 associated with and engaging contact 502 when the coil of relay 661 is not energized, is connected by lead 504 to terminal 784 of printing unit 667. Terminals 795 and 796 on terminal strip 731 are connected by leads 798 and 799 to common mains 801 and 802 connected to one side of a plurality of conventional counters 589A to L and 589' A to L, illustratively twelve in number corresponding to a number of postal zones. The other sides of said counters 589A to L and 589'A to L are connected respectively by leads 590 and 590' to the twelve terminals A to L on terminal strip 257 of postal zone decoder unit 219 which is identical to relay bank 241 in Fig. 7 except that main 248 is connected to ground.

Operation

To facilitate the mailing of issues of periodicals and the promotional work desired, the system in the embodiment shown is designed automatically to imprint five lists of names and addresses of subscriptions as follows:

(a) An expire list of those whose subscriptions expire in the current month, (b) A pre-expire list of those whose subscriptions expire in any one of the three ensuing months, (c) A bulk mailing list of those in towns having more than two subscriptions, (d) An individual mailing list of those in towns having less than three subscriptions, and (e) A galley list of all those to whom periodicals are to be mailed.

Issues of the periodicals are to be sent to all those whose subscriptions expire during and after the current month, illustratively June 1952. Thereupon the system is to remove from the file the cards for currently expired subscriptons, i.e. those for June 1952 and also to select subscriptions about to expire, say in July so literature may be sent to prompt renewals.

The operation of the system to perform these functions will now be described.

Date setting unit 265 (Fig. 5) is now manually set as follows: The arms 288 of switches 285A, B and H are set to engage the sixth, seventh and sixth fixed contacts 289 respectively, corresponding to the months of June, July and June respectively. The movable arms 288 of switches 286A, B and H are all set to engage the fifth fixed contact 289 corresponding to the decade "five" and the movable arms 288 of switches 287A, B and H are all set to engage the second fixed contact 289 corresponding to the year "two." In addition, switch 300' associated with wafer switch 285B is closed.

When the date setting switch unit is thus set up, a master switch (not shown) is closed to energize the various components of the equipment and the motor M is thereupon energized to start the card feed.

Photoelectric cell 488 (Fig. 2) receiving light from source 489 is energized to move arm 485 of relay 484 into engagement with fixed contact 483. However, as conductive arcuate strip 498 of wheel 497 does not now engage wiper arm 496, there will be an open circuit from B+ to the coil 490 of relay 491 so that motor M will remain energized.

Assuming that, as shown in Fig. 2, the ganged arms 434 of the stepping switch 428 are in the first position engaging contacts 429 when the equipment is started, a circuit will be completed from B+, lead 436 through arms 434, contacts 429 to terminal 416, terminals 408, 415, 414 and terminal 401 on terminal strips 402 associated with banks 341, 343 and 342 respectively of delay unit 225 (Fig. 6).

When terminal 416 of bank 341 has thus been connected to B+, the coil 378 of relay 352 of said bank 341 will be energized. The connection of terminals 408, 415 and 414 of bank 343 to B+ will have no effect as they are in open circuits at contacts 356, 359 and the connection of terminal 401 of bank 342 to B+ will energize relay 353 thereof to open its contacts 379, 381.

When relay 352 of bank 341 is energized, the movable arms 365 to 370 thereof will engage the associated fixed contacts 372 to 377 respectively. As a result, a circuit will be completed from ground through the closed contacts 379, 381 of relay 353 of bank 341, lead 397 to movable arms 358 of relays 346 to 351 and through the closed contacts of relay 352 and leads 391 to 395 to one side of the coils 355 of said relays 346 to 351 of bank 341. The system is readied to accept the information to be transmitted to it to bring about the ensuing selective operation in the cycle.

Starting of the equipment will cause the advancing means 30 to move the bottommost card from the hopper 35, illustratively a town index card 22 (Fig. 12) to the sensing station 32 where it will remain at rest say for .15 second, intercepting the light from source 489 to photoelectric cell 488 thereby de-energizing relay 484 so that its movable arm 485 will engage fixed contact 500. This will complete a circuit from wiper arm 496, through lead 499, contact arm 485, contact 500, lead 501 to arm 474 of relay 475. The circuit by way of lead 473 to coil 435 of stepping switch 428 is open at this time until motor M has turned wheel 497 sufficiently to bring conductive arcuate strip 498 into engagement with wiper arm 496 to close connection to B+. However, as the stepping switch is of the type that only moves its contact arms upon de-energization, no motion will be imparted to such arms at this time.

Due to the 60 c.p.s. pulses delivered from the square wave generator 82 (Fig. 1) through lead 81 to the sweep generator in camera 51, its electronic beam will scan over the row 24a of town index card 22. Concurrent therewith, the 60 c.p.s. pulses from square wave generator 82 will also be delivered through lead 104 to amplifiers 105, 106 (Fig. 1). The outputs of said amplifiers will be differentiated and clipped by the associated differentiator and clipper units 109, 116 and 111, 116 so that negative pulses occurring at a PRF of 60 c.p.s. will be delivered to the input terminals 119 of date code converter unit 95 and postal zone converter unit 96 respectively. Consequently, negative pulses will be applied at a PRF of 60 c.p.s. to the grid 133 (Fig. 3) of tube 127 of the first multi-vibrator 125 of the 13 multi-vibrators in the unit 95 and the six multi-vibrators in the unit 96.

The first negative pulse thus applied from the differentiated and clipped square wave from amplifier 105 or 106 to the terminal 119 of the date code converter unit 95 and the postal zone converter unit 96 and hence to the grid 133 of tube 127 of the first multi-vibrator 125 of each, renders that tube non-conductive. As a result, the plate potential of tube 127 will rise rapidly; will charge capacitor 131, and apply a rising potential to the grid 128 of tube 126 which will overcome the negative potential on such grid applied through resistance 153 so that tube 126 will conduct.

Although the negative pulse upon tube 127 will disappear and another negative pulse will not appear until 16,666 μsec later due to 60 c.p.s. pulses from the square wave generator 82, tube 126 will remain conducting and tube 127 cut off for a period based on the length of time it takes capacitors 131 and 135 to discharge, which time is illustratively set at 1,200 μsec. When the capacitors 131 and 135 finally discharge, the tube 127 will again conduct and tube 126 will be again cut off.

Thus, an output pulse in the form of a square wave having a time duration of 1,200 μsec is transmitted through lead 143. This 1,200 μsec pulse will be differentiated by the capacitor 144 and resistor 146 to form positive and negative pulses and the diode clipper tube 149 will remove such positive pulses so that only the negative pulses will be present in lead 147 to be applied to the grid 133 of tube 127 of the second multi-vibrator 125. This operation will continue until all thirteen of the multi-vibrators in the date code converter unit 95 and all six of the multi-vibrators in the postal zone converter unit 96 have fired. As each succeeding multi-vibrator will fire 1,200 μsec after the one before, it is apparent that all thirteen of the multi-vibrators in unit 95 will fire in a time interval of 13×1,200 or 15,600 μsec, and all six of the multi-vibrators in unit 96 will fire in a time interval of 6×1,200 or 7,200 μsec, i.e., before the second negative pulse from the second cycle of the 60 c.p.s. pulses from the amplifier 105 or 106 is applied to the input terminal 119 of the multi-vibrator lines of units 95 and 96, and such lines of multi-vibrators serve as generators to deliver periodic electrical impulses.

The signal taken from the grid 128 of each of the multi-vibrators, which also is a positive pulse having a time duration of 1,200 μsec, is applied to the control grid 159 of the associated gate tube 161. The gate tubes 161 are so biased to cut-off, that the application of the 1,200 μsec pulse alone to the control grid 159 will not cause conduction of such tube.

As the electronic beam from camera 51 sweeps over row 24a of the town index card 22 which is at rest at sensing station 32, it will only encounter a bar at region 13 as shown in Fig. 12. Consequently, this bar will cause a pulse to be developed which will be fed by camera 51 through line 83 (Fig. 1) to amplifier 84. The amplified pulse will be passed through line 86 to movable contact arm 87 of switch 59 (Fig. 2) and thence through fixed contact 88 and lead 91 to the input terminal 93 of the date code converter unit 95 (Fig. 6) which is connected to all of the suppressor grids 169 of the gate tubes 161.

As the start of the sweep of the camera 51 and the firing of the first multi-vibrator 125 in the converter units 95 and 96 are initiated by the pulse from square wave generator 82, they occur at substantially the same time and it is apparent that if a code bar is present at the first region on the card being scanned, pulses will be applied to both the control grid 159 and suppressor grid 169 of the first gate tube so that such tube could conduct. However, as the pulse from the camera 51 and amplifier 84 caused by the code bar is only 100 μsec in width, the gate tube 161 would only conduct for this period.

As there is no code bar at the first region on the town index card, but one at the thirteenth region spaced 3 9/16 inches (12×4/13) from the position of the first bar in the first region it is apparent that a pulse will occur 15,384 μsec after the start of the sweep of the camera and after the firing of the first multi-vibrator 125. However, after a period of 15,384 μsec, the first twelve multi-vibrators in unit 95 will no longer be functioning as the pulse duration of each is 1,200 μsec and only the thirteenth multi-vibrator in the line will be in operation. Consequently, although the 100 μsec pulse from the camera will simultaneously be delivered to the suppressor grids 169 of all of the gate tubes 161, only the thirteenth gate tube will also have a 1,200 μsec duration pulse on its control grid 159 at this time and consequently only the thirteenth gate tube 161 will conduct. Thus, during the course of the sweep of the camera 51 across the four inches on the card 22, only that gate tube 161 will conduct which corresponds in number to the position of the code bar on the card, i.e., if there is a code bar at region one, the first gate tube 161 will conduct. If there is a bar at each of regions one and two, the first gate tube will conduct and then the second gate tube will conduct and so on.

Due to the conduction of the thirteenth gate tube 161 of the date code converter unit 95, as previously described a negative pulse of 100 μsec duration will be fed from plate 165 of tube 161 (Fig. 3) through lead 181 to amplifier 183 to be inverted into a positive pulse which is fed to the control grid 186 of the associated thyratron tube 187. Consequently, tube 187 which is thirteenth in line will conduct so that current will flow from B+ through coil 203 of relay 204 to ground to bring arm 205 into engagement with fixed contact 206. This will complete a circuit from B+ through contacts 205, 206, lead 207 to the thirteenth terminal 208 on terminal strip 209 of unit 95 (Fig. 1) lead 175 through coil 176 of relay 177 to ground.

Energization of relay 177 will open the contacts 178, 179 to break the circuit from B+ through lead 180 to terminal 191 of postal zone converter unit 96. As terminal 191 (Fig. 3) is connected to the plates 189 of all of the six thyratrons 187 in the postal zone converter unit 96, those thyratrons 187 that had been conducting due to a previous cycle of the equipment will be cut off to de-energize the associated relays 204 to ready the unit 96 for the postal zone information to be transmitted thereto from the town index card 22 in the manner hereinafter to be described.

While the town index card is at the sensing station 32, the motor M (Fig. 2) has been rotating the contact wheels 53, 97, 199 and 497 in a counterclockwise direction. After a sufficient period of time to permit the scanning of row 24a and the operation of unit 95, relay 177 and unit 96 above described, the arcuate contact 54 on wheel 53 will engage wiper arm 55. As a result, a circuit will be completed from B+, through contact 54, wiper arm 55, lead 57, coil 58 of relay 59 to ground.

Due to the energization of coil 58, movable arm 62 will engage fixed contact 64 and movable arm 87 will engage fixed contact 89. This will connect the potentiometer 71 (Fig. 2), through lead 66, contacts 64, 62, terminal 78 and lead 77 to one side of the deflection coil 76 (Fig. 1) in camera 51, the other side of said coil being connected through lead 75, terminal 73 and lead 72 back to the potentiometer 71 (Fig. 2). The potential thus applied to coil 76 deflects the electronic beam from camera 51 so as to scan the second row 25a on card 22 (Fig. 12).

Assuming that the town listed on the town index card 22 is in the first postal zone, there will be a bar at the second region on row 25a of card 22 as shown in Fig. 12. As a result, after the sweep of the second row 25a started, as previously described, the second multi-vibrator 125 in the postal zone converter unit 96 will deliver a 1,200 μsec pulse to the control grid 159 of the associated gate tube 161 (Fig. 3) and a 100 μsec pulse from camera 51 will be delivered through lead 83, amplifier 84, lead 86, arm 87 (Fig. 2) (which is now engaging fixed contact 89 due to the energization of relay 59 when the camera started to scan row 25a), lead 92, to terminal 93 of postal zone converter unit 96 (Fig. 3) and thence to the suppressor grids 169 of all of the gate tubes 161 in unit 96.

As only the second gate tube 161 in the unit 96 would have both the 1,200 μsec pulse and the 100 μsec pulse from the multi-vibrator and the code bar from region 2 on card 22 respectively, only the second gate tube 161 would conduct as would the associated thyratron 187. This second thyratron 187 would remain conducting to energize the associated relay 204 so that the second terminal 208 on terminal strip 209 of unit 96 (Fig. 1) would be connected to B+.

The second terminal 208 is connected by lead 210 (Fig. 1) to terminal 1 on terminal strip 218 of the postal zone decoder unit 219. As previously described, the postal zone decoder unit 219 corresponds to relay bank 241 shown in Fig. 4 except that main 248 is connected to ground. Consequently, as terminal 1 on terminal strip 218 has been connected to B+ as previously described, and is connected by lead 240 to one side of grounded coil 238 of relay 241A, relay 241A will be energized. This will bring contact arms 244a, e, h, j and k of relay 241A into engagement with the associated fixed contacts 245a, e, h, j and k and move the other contact arms away from the associated fixed contact. As can readily be seen from Fig. 4, but one of the twelve possible circuits will be completed, i.e., that due to the engagement of arm 244a of relay 241A with fixed contact 245a, and the terminal A on terminal strip 257 (Fig. 1) will be connected to ground through lead 249, movable arms 244a and fixed contacts 245a of relays 241A, B, C and D.

As terminal A on terminal strip 257 is connected by lead 590 and 590' to one side of the first counters 589A and 589'A which correspond to the first postal zone, these counters are now readied for actuation.

As the electronic beam continues its scanning of row 25a of the town index card, it will pick up at region 6 the town index code bar which is common to all index cards.

In the manner previously described, the sixth thyratron 187 of the postal zone converter unit 96 will be made to conduct to energize the associated relay 204. As a result, terminal 6 on terminal strip 209 of unit 96 (Fig. 1) will be connected to B+ through contact arm 205 and fixed contact 206 of the associated relay 204 (Fig. 2).

Such B+ source will be connected from terminal 6 on terminal strip 209 of unit 96 through leads 231 and 232 to terminal 334 of delay unit 225 and through lead 231 to the input 336 of inverter-multi-vibrator unit 278 (Fig. 13).

The inverter-multi-vibrator unit 278, will invert the B+ pulse applied to grid 338 of amplifier tube 339 so that a negative pulse will be delivered from plate 340 of tube 339 to grid 133' of tube 127' (Fig. 13) to cause such tube to cut off so that a positive pulse of pre-determined duration based upon the time constant of multi-vibrator 125', illustratively .1 second, will be delivered from plate 132' to the output 279 of unit 278 and thence by lead 234 (Fig. 1) to terminal 235 of the mailing classifier unit 229.

When the B+ is connected to terminal 334 of delay unit 225 due to the bar at region 6 on the town index card, a circuit will be completed from such terminal 334 (Fig. 6), lead 386, fixed contact 363 of relay 349 of bank 341, arm 362 through coil 355, leads 389 and 394, closed contacts 367, 374 of relay 352 which has been previously energized due to the engagement of arms 434 of switch 428 with contacts 429 (Fig. 2), lead 397, closed contacts 379, 381 of relay 353 to ground.

As a result, relay 349 will be energized and arm 357 which is connected to B+ will engage arm 362 to move it away from fixed contact 363. At the same time arm 358 will engage fixed contact 361 to provide a holding circuit for relay 349 and arm 356 will engage fixed contact 359.

When the system was originally started, the manual switches 523 and 609 of the mailing classifier unit 229 shown in Fig. 7 were momentarily closed. As a result, a circuit was completed from B+ through closed contacts 524 and 522 of switch 523, coil 521 of relay 506, lead 525, through normally closed contacts 512, 516 of relay 510, lead 526 to ground. In addition, a circuit was completed from B+ through closed contacts 611, 608 of switch 609, coil 607 of relay 591, lead 612 through normally closed contacts 602, 598 of relay 595, lead 613 to ground.

The energization of the coils 521 and 607 of relays 506 and 591 will bring the arms 511 and 597 thereof against the associated fixed contacts 519 and 606 which are connected to B+ to provide a holding circuit for such coils as long as the associated contacts 512, 516 and 602, 598 of relays 510 and 595 remain closed.

In addition, when relay 506 is energized, arms 513 and 514 will engage fixed contacts 517, 518 respectively and arm 512 will move away from fixed contact 516 and when relay 591 is energized, arms 596, 599 and 600 will engage the associated fixed contacts 603, 604 and 605 respectively and arm 598 will move away from fixed contact 602.

As terminal 235 of the mailing classifier unit has been momentarily connected to B+ as previously described, a circuit will be completed through lead 532, closed contacts 517, 513 of relay 506, lead 537, closed contacts 515, 511 of relay 510, coil 521 of said relay, lead 527, closed contacts 512, 516 of relay 509 and lead 526 to ground.

As the result of the energization of coil 521 of relay 510, arm 511 thereof will engage fixed contact 519 which is connected to B+ to provide a holding circuit for said coil through the closed contacts 512, 516 of relay 509 and lead 526 to ground.

Energization of relay 510 will also move arms 513 and 514 into engagement with fixed contacts 517 and 518 respectively and move arm 512 away from fixed contact 516 to break the circuit to coil 521 of relay 506 so that its arms 511 and 512 will re-engage fixed contacts 515 and 516 and arms 513 and 514 will move away from their fixed contacts 517 and 518.

At this stage in the sequence of operation, the motor M (Fig. 2) will have rotated contact wheel 53 to break contact of strip 54 with wiper arm 55. As a result, relay 59 will be de-energized so that arms 62 and 87 will move away from contacts 64 and 89 and will re-engage fixed contacts 63 and 88 respectively. Consequently, the potentiometer 69 will again be connected to deflection coil 76 in camera 51 to set the electronic beam to scan the first row 24a of the town index card and the output of camera 51 will be connected through contacts 87 and 88 and lead 91 to the input 93 of the date code converter unit 95.

At this time also the wheel 497 will have been rotated by motor M to move wiper arm 496 out of engagement with arcuate strip 498 to break the circuit from B+ to coil 435 of stepping switch 428. Upon breaking of circuit to coil 435 the arms 434 of the stepping switch 428 will move to engage contacts 430.

As a result, relay 352 of the first memory bank 341 (Fig. 6) will be de-energized so that arms 365 to 370 will move away from fixed contacts 372 to 377. However, relay 349 will remain energized due to the holding circuit from B+, through arms 357, 362, coil 355, closed contacts 361, 358, lead 397, closed contacts 381, 379 of relay 353 to ground. In addition, relay 353 of bank 342 will be de-energized so that contacts 379, 381 will engage, and a circuit will be completed from B+ through lead 436, arms 434 of switch 428, contacts 430 to terminals 416, terminals 408, 415, 414 and terminal 401 on terminal strips 402 associated respectively with banks 342, 344 and 343 of delay unit 255 (Fig. 6).

When terminal 416 of bank 342 is connected to B+ the coil 378 of relay 352 of bank 342 will be energized. The connection of terminals 408, 415 and 414 of bank 344 to B+ will have no effect as they are in open circuits and the connection of terminal 401 of bank 343 to B+ will energize relay 353 to open its contacts 379, 381.

When relay 352 of bank 342 is energized, the arms 365 to 370 thereof will engage the associated fixed contacts 372 to 377 respectively. As a result, a circuit will be completed from ground, through the closed contacts 379, 381 of relay 353, lead 397 to movable arms 358 of relays 346 to 351; and through the closed contacts of relay 352 and leads 391 to 395 to one side of the coils 355 of said relays 346 to 351 of bank 342.

At this time, the index card 22 which has been at rest at the sensing station for say .15 second, will be released by conventional mechanism which is part of the feeding unit 31, for advance by conveyor 34 away from the sensing station. Also the arcuate contact 98 on wheel 97 (Fig. 2) will engage wiper arm 101, to ground the output of amplifier 84 through lead 99 (Fig. 1) so that no pulses will be sent to the date code converter unit 95, which would result in erroneous impulses were the index card being scanned while moving.

When the town index card moves away from the sensing station 32, photoelectric cell 488 will again be energized so that arm 485 of relay 484 will engage fixed contact 483. However, as wheel 497 has by then been rotated so that arcuate strip 498 no longer engages wiper arm 496, there will be an open circuit from B+ to the coil 490 of relay 491 so that motor M will remain energized for continued operation of the equipment.

As the town index card 22 is moved away from the sensing station, the next card in the hopper 35, which is a subscription card 21 will be advanced to such sensing station 32.

By reason of the length of arcuate contact 98, the output of amplifier 84 will remain grounded until the subscription card 21 comes to rest at the sensing station. Just prior to the movement of contact 98 away from wiper arm 101 to remove the ground from amplifier 84, the contact 198 (Fig. 2) on contact wheel 199 will be engaged by wiper arm 197. As a result, a circuit will be completed from B+ through contact 198, wiper arm 197, coil 196 of relay 194 to ground. Energization of relay 194 will move contact arm 193 away from fixed contact 195 to break the circuit from B+ through lead 192 (Figs. 1 and 2) to terminal 191 of date code converter unit 95. As a result, any of the thyratrons 187 (Fig. 3), in unit 95 which had been previously conducting, will be cut off to open the associated relays 204 to re-cycle the unit.

When the subscription card at the sensing station 32 intercepts the light to photoelectric cell 488, relay 484 will again be de-energized so that arm 485 will engage fixed contact 500. This will complete a circuit from wiper arm 496 (Fig. 2) lead 499, contact arm 485, contact 500, lead 501 to arm 474 of relay 475, lead 473 to coil 435 of switch 428. However, as wiper arm 496 is not yet engaging arcuate contact 498 connected to B+, coil 435 will not be energized until the motor M has rotated wheel 497 to effect such engagement. The energization of coil 435 as previously pointed out will not move the arms 434 of said switch.

At this time, the electronic beam from the camera 51 will scan the row 24 of the first subscription card. Inasmuch as contact 98 on contact wheel 97 shown in Fig. 2 is no longer engaging wiper arm 101, the output of amplifier 84 connected to the camera 51 will not be grounded and will pass through the system.

A subscription card with an expiration date thereon of June '52, as shown in Figs. 10 and 11 has a bar on row 24 at regions 2, 3, 5, 6 and 10 (Fig. 11). As the electronic beam scans row 24 on such subscription card 21, the 2nd, 3rd, 5th, 6th and 10th thyratron (Fig. 3) of the date code converter 95 will be energized in the manner previously described and the associated relays 204 will be closed thereby connecting the 2nd, 3rd, 5th, 6th and 10th terminal 208 on terminal strip 209 to B+.

As a result, the corresponding terminals on the terminal strip 212 associated with the date code decoder unit 213 will also be conected to B+ through leads 211. As shown in Fig. 4, the terminals 2, 3, 5, 6 and 10 are connected respectively to relays 241B, 241C, 242A, 242B and 243B.

As a result of the energization of relays 241B and C, but a single circuit will be completed and that by the movement of the two open arms 244f of said relays to closed position, thereby to complete a circuit from B+ through the closed contacts f of relays 241A, B, C and D, through lead 249, to terminal f on terminal strip 251.

As the result of the energization of relays 242A, B, but a single circuit will be completed and that by the movement of the two open arms 244e of said relays to closed position, thereby to complete a circuit from B+ through the closed contacts e of relays 242A, B, C, D to terminal e on terminal strip 254.

As a result of the energization of relay 243B, but a single circuit will be completed and that by the movement of the open arm 244b of said relay to closed position, thereby to complete a circuit from B+ through the closed contacts b of relays 243A, B, C, D to terminal b on terminal strip 255.

As the terminal 251a to l, 254a to j and 255a to j are connected respectively by leads 258, 259 and 261 (Fig. 1) to corresponding terminals on terminal strips 262, 263 and 264 of the date setting unit 265 shown in Fig. 5, the energization of the relays above described in the date code decoder unit 213, results in selectively connecting the terminals 262f, 263e and 264b to B+ and circuit therefrom is completed through the associated relays 268F, 269E and 271B to ground.

By reason of the energization of the fiifth relay, i.e., 268F the associated or fifth arms 272a to h of each of the eight sections controlled by said relay 268F will engage the associated fixed contacts 281a to h. Similarly, by reason of the energization of the fourth relay i.e., 269E, the associated or fourth arms 272a to h of each of the eight sections controlled by said relay 269E will engage the associated fixed contact 281a to h. By reason of the energization of the second relay i.e., 271B, the associated or second arms 272a to h of each of the eight sections controlled by said relay 271B will engage the associated fixed contact 281a to h.

As the relays 268F, 269E and 271B relate to a date on the subscription card on June '52 and as the wafer switches 285A, 286A and 287A and 285H, 286H and 287H have been set as previously described to the expiration date of June '52, a circuit will be completed from B+ through lead 311, the second arm 274a which is closed by relay 271B, the second fixed contact 283a engaged thereby, to the second contact 289 of wafer switch 287A; thence by arm 288, lead 301, the fifth arm 273a which is closed by relay 269E, the fifth fixed contact 282a engaged thereby to the fifth contact 289 of wafer switch 286A; thence by arm 288, lead 292, the sixth arm 272a which is closed by relay 268F, the sixth fixed contact 281a engaged thereby, lead 291 to the sixth contact 289 of wafer switch 285A; thence by arm 288, lead 319 to terminal 321 on terminal strip 322, which is connected by lead 331 to terminal 333 on terminal strip 224 of delay unit 225 (Fig. 6).

A similar circuit will be completed from B+ through the associated wafer switches 287H, 286H and 285H to terminal 329 on terminal strip 322 which is connected to terminal 223 of delay unit 225.

When the B+ is connected to terminal 333 of delay unit 225, due to the date of June '52 on row 24 on subscription card 21, a circuit will be completed from such terminal 333, lead 384, fixed contact 363 of relay 347 of the second memory bank 342, arm 362 through coil 355, leads 389, 392, closed contacts 369, 376 of relay 352, lead 397, closed contacts 379, 381 of relay 353 to ground.

As a result relay 347 of bank 342 will be energized and arm 357 which is connected to B+ will engage arm 362 to move it away from fixed contact 363. At the same time arm 358 will engage fixed contact 361 to provide a holding circuit for relay 347 and arm 356 will engage fixed contact 359.

When the B+ is connected to terminal 223 of delay unit 225, due to the date of June '52 on row 24 of subscription card 21, a circuit will be completed from such terminal 223, lead 387, fixed contact 363 of relay 350 of bank 342, arm 362 through coil 355, leads 389, 395, closed contacts 366, 373 of relay 352, lead 397, closed contacts 379, 381 of relay 353 to ground.

As a result relay 350 of bank 342 will be energized and arm 357 which is connected to B+ will engage arm 362 to move it away from fixed contact 363. At the same time arm 358 will engage fixed contact 361 to provide a holding circuit for relay 350 and arm 356 will engage fixed contact 359.

These operations set the relays 347 and 350 of memory bank 342 so that they will perform subsequent control and classification functions in the manner hereinafter described.

After the row 24 on the subscription card 21 has been scanned, the further rotation of contact wheel 53 brings arcuate contact 54 into engagement with wiper arm 55 to deflect the electronic beam in the manner previously described so that the second row 25 will then be scanned. As this row has only a single code bar at the first region, as previously described, the first thyratron 187 in the postal zone converter unit 96 will be energized inasmuch as the output of camera 51 has been switched to the input 93 of such unit by the energization of relay 59 shown in Fig. 2.

Said first thyratron 187 in the postal zone converter unit 96, energizing the corresponding relay 204, B+ will be connected to the terminal 1 of terminal strip 209 of unit 96, with consequent current from said strip through leads 221 and 280 (Fig. 1) to terminal 233 of delay unit 225 and through lead 221 through grounded counter 309 so that said subscription card will be counted. In addition, as terminal 1 is connected to the input 336 of invertermulti-vibrator unit 278, a positive pulse of predetermined duration will be delivered from the output 279 of such unit 278 through lead 230, closed contacts 226 and 220 of relay 217, lead 222 to terminal 227 on terminal strip 228 of mailing classifier unit 229.

When the B+ is connected to terminal 233 of delay unit 225 due to the bar at region 1 on the subscription card, a circuit will be completed from such terminal 233 (Fig. 6), lead 383, fixed contact 363 of relay 351 of memory bank 342, arm 362 through coil 355, leads 389, 396, closed contacts 365, 372 of relay 352, lead 397, closed contacts 379, 381 of relay 353 to ground.

As a result, relay 351 of bank 342 will be energized and arm 357 which is connected to B+ will engage arm 362 to move it away from fixed contact 363. At the same time arm 358 will engage fixed contact 361 to provide a holding circuit for relay 351 of bank 342 and arm 356 will engage fixed contact 359, thereby setting the relay 351 for subsequent control and classification functions.

Referring to Fig. 7, when terminal 227 of the mailing classifier unit is connected to B+ a circuit will be completed through lead 538, closed contacts 518 and 514 of relay 510 which had been previously energized when terminal 235 was connected to B+ due to the code bar at region 6 on the town index card, input terminal 539 of counting unit 545 to fixed contact 561 of relay 546, arm 557 engaging such fixed contact, coil 551, lead 583, closed contacts 572, 569 of relay 548, lead 585, closed contacts 576, 575 of relay 549 to ground.

As a result of this circuit, relay 546 of counting unit 545 will be energized so that movable arm 557 will engage fixed contact 562 connected to B+ to provide a holding circuit for said relay; movable arm 555 will engage fixed contact 558 and movable arm 556 will engage fixed contact 559.

At this time also wheel 497 (Fig. 2) will have been rotated by motor M to bring arcuate contact 498 out of contact with wiper arm 496, thus to break the circuit from B+ through lead 499, contacts 485, 500 of relay 484, leads 501 and 473 to coil 435 of stepping switch 428. Coil 435 being now de-energized the arms 434 of stepping switch 428 will move to engage the next contact 431.

As a result, relay 352 of bank 342 will be de-energized so that arms 365 to 370 will move away from fixed contacts 372 to 377 and relay 353 of bank 343 will be de-energized so that its contacts 379, 381 will close. However relays 347 and 351 of bank 342 will remain energized due to the holding circuits from B+ through closed contacts 358, 361, lead 397, closed contacts 379, 381 of relay 353 to ground.

In addition, a circuit will be completed (Fig. 2), from B+ through lead 436, arms 434, contacts 431 to terminal 416; terminals 408, 415, 414 and terminal 401 on terminal strip 402 associated with banks 343, 345 and 344 of switch 428.

When terminal 416 of bank 343 is thus connected to

B+, the coil 378 of relay 352 of bank 343 will be energized. When terminals 408, 415 and 414 of bank 345 are thus connected to B+, as such terminals lead to open switches they will have no effect. The connection of B+ to terminal 401 of bank 344 will energize relay 353 of bank 344 to open its contacts 379, 381, thereby disconnecting line 397 to de-energize any of the relays 346 to 351 of bank 344 which had previously been energized.

When relay 352 of memory bank 343 is energized the movable arms 365 to 370 thereof will engage the associated fixed contacts 372 to 377 respectively. As a result, a circuit will be completed from ground, through the closed contact 379, 381 of relay 353, lead 397 to movable arms 358 of relays 346 to 351 and through the closed contacts of relay 352 and leads 391 to 395 to one side of the coils 355 of said relays 346 to 351.

After a period of say .15 second, the subscription card at the sensing station will be released and advanced by the conveyor 34 and the next card in the hopper 35 which for example also is a subscription card, will be moved by the advancing mechanism 30 to the sensing station 32.

When the first subscription card 21 moves away from the sensing station 32, photoelectric cell 488 (Fig. 2) will again be energized so that arm 485 of relay 484 will engage fixed contact 483. However, as wheel 497 has been rotated so that arcuate contact 498 is no longer engaging wiper arm 496 there will be an open circuit from B+ to the coil 490 of relay 491 so that motor M will remain energized.

As previously described, just prior to the movement of contact 98 away from wiper arm 101 to disconnect from ground amplifier 84, the momentary engagement of contact 198 on contact wheel 199 by wiper arm 197 will break the circuit from B+ through lead 192 (Figs. 1 and 2) to terminal 191 of date code converter unit 95. As a result the thyratrons 187 in unit 95 which had been previously conducting due to the June '52 code on the first subscription card will be cut off to open the associated relays 204 to recycle the unit.

When the second subscription card comes to rest at the sensing station it will intercept the light to photoelectric cell 488 for engagement of contact 500 by arm 485.

As motor M rotates wheel 497, the arcuate contact 498 connected to B+ will engage wiper arm 496 for energization of coil 435 of switch 428 which however, as previously pointed out, will not move its arms 434.

At this time the electronic beam from the camera 51 will scan row 24 of the second subscription card. Inasmuch as contact 98 on contact wheel 97 shown in Fig. 2 is no longer engaging wiper arm 101, the output of amplifier 84 connected to the camera 51 will not be grounded and will pass through the system.

Assuming that the second subscription card has an expiration date thereon of July '52 as shown in Fig. 10, there will be a bar on row 24 at regions 3, 4, 5, 6 and 10. Consequently, as the electronic beam scans row 24 on subscription card 21 the 3rd, 4th, 5th, 6th and 10th thyratron of the date code converter unit 95 will be energized in the manner previously described, and the associated relays 204 will be closed thereby connecting the 3rd, 4th, 5th, 6th and 10th terminals 208 on terminal strip 209 to B+.

As a result, the corresponding terminals on the terminal strip 212 associated with the date code decoder unit 213 will also be connected to B+ through leads 211 (Fig. 1), and as shown in Fig. 4, relays 241C, 241D, 242A, 242B and 243B will be energized.

As a result of the energization of said relays in the manner above described terminals g, e and b at terminal strips 251, 254 and 255 respectively will be connected to B+ representing the date of July '52. Consequently the terminals g, e and b on terminal strip 262, 263 and 264 (Fig. 5) will be connected to B+ to energize the associated relays 268G, 269E and 271B.

As the relays 268G, 269E and 271B relate to a date on the subscription card of July '52 and as the wafer switches 285B, 286B and 287B have been set, as previously described, to the expiration date of July '52, a circuit will be completed from B+ through wafer switches 287B, 286B and 285B, closed switch 300', lead 324 to terminal 325 on terminal strip 322 which is connected to terminal 332 of delay unit 225, Fig. 6.

When the B+ is connected to terminal 332 of delay unit 225 due to the date of July '52 on row 24 of the second subscription card 21, a circuit will be completed from such terminal 332, lead 383, fixed contact 363 of relay 346 of bank 343, arm 362 through coil 355, leads 389, 391, closed contacts 370, 377 of relay 352, lead 397, closed contacts 379, 381 of relay 353 to ground.

As a result, relay 346 of bank 343 will be energized and arm 357 which is connected to B+ will engage arm 362 to move it away from fixed contact 363; arm 358 will engage fixed contact 361 to provide a holding circuit for relay 346 and arm 356 will engage fixed contact 359.

After row 24 on the subscription card 21 has been scanned, by reason of the rotation of contact wheel 53 (Fig. 2), the arcuate contact 54 thereon will engage wiper arm 55 to deflect the electronic beam in the manner previously described so that the second row 25 will be scanned.

As this row 25 has a code bar at the first region, as previously described, B+ will be connected from terminal 1 on postal zone converter unit 96 to counter 309 (Fig. 1) to count the second subscription card. In addition B+ will be connected from terminal 1 to terminal 233 of the delay signal unit 225 and B+ will be connected for a predetermined period from unit 278 in line 335 to terminal 227 of the mailing classifier unit 229 through the closed contacts 220, 226 of relay 217.

When terminal 233 of unit 225 is connected to B+ (Fig. 6), relay 351 of memory bank 343 will be energized and arm 357 which is connected to B+ will engage arm 362 to move the latter away from fixed contact 361 to provide a holding circuit for relay 351 of bank 343 and arm 356 will engage fixed contact 359.

Referring to Fig. 7 when terminal 227 of the mailing classifier unit is connected to B+ a circuit will be completed through lead 538, closed contacts 514, 518 of relay 510, input terminal 539 of counting unit 545, through closed contacts 555, 558 of previously energized relay 546 of unit 545, lead 586, fixed contact 566 of relay 547, movable arm 564, engaging such fixed contact, coil 552, lead 583, closed contacts 569, 572 of relay 548, lead 585, closed contacts 575, 576 of relay 549 to ground.

As a result of this circuit, relay 547 of counting unit 545 will be energized so that movable arm 564 will engage fixed contact 567 connected to B+ to provide a holding circuit for said relay and movable arm 563 will engage fixed contact 565.

At this time also the wheel 497 (Fig. 2) will have been rotated by motor M so that wiper arm 496 no longer engages arcuate strip 498 to break the circuit from B+ to the coil 435 of switch 428 and the arms 434 of stepping switch 428 will move to engage contacts 432.

As a result, relay 352 of bank 343 (Fig. 6) will be de-energized. However, relays 346 and 351 of memory bank 343 will remain energized due to the associated holding circuits.

In addition, a circuit will be completed from B+, through lead 436, arms 434, contacts 432 to terminal 416; terminals 408, 415, 414 and terminal 401 on terminal strip 402 associated with memory banks 344, 341 and 345 of delay unit 225 to energize coil 378 of relay 352 of memory bank 344. As a result the arms 365 to 370 of said relay will engage fixed contacts 372 to 377 respectively to connect to ground one side of all of the coils 355 to relays 346 to 341 of bank 344. When terminal 408 is connected to B+ a circuit will be completed from such terminal 408, lead 407, closed contacts 356, 359 of relay 349 of bank 341, lead 406 to terminal 454 of unit 225.

The connection of B+ to terminal 401 of bank 345 will energize relay 353 of bank 345 to open contacts 379, 381 thereof, thereby disconnecting line 397 from ground to de-energize any of the relays 346 to 351 of bank 354 which had previously been energized.

After a period of say .15 second, the second subscription card at the sensing station will be released and advanced by the conveyer 34 and the next card in the hopper 35 which for example, also is a subscription card, will be moved by the advancing mechanism 30 to the sensing station 32.

When the second subscription card 21 moves away from the sensing station 32, photoelectric cell 488 will again be energized so that arm 485 of relay 484 will engage fixed contact 483. However as wheel 497 (Fig. 2) has been rotated so that arcuate contact 498 is no longer engaging wiper arm 496 there will be an open circuit from B+ to the coil 490 of relay 491 so that motor M will remain energized. Just prior to the movement of contact 98 away from wiper arm 101 to disconnect from ground amplifier 84, the momentary engagement of contact 198 on contact wheel 199 by wiper arm 197 will break the circuit from B+ through lead 192 (Figs. 1 and 2) to terminal 191 of date code converter unit 95 (Fig. 3). As a result the thyratrons 187 in unit 95 which had been previously conducting due to the July '52 code on the second subscription card will be cut off to open the associated relays 204 to recycle the unit.

When the third subscription card comes to rest at the sensing station it will intercept the light to photoelectric cell 488 for engagement of contact 500 by arm 485.

As motor M rotates wheel 497 the arcuate contact 498 connected to B+ will engage wiper arm 496 for energization of coil 435 of switch 428 which however, as previously pointed out, will not move the arms 434 of said switch.

At this stage in the sequence of operation, the town index card will have been moved by the conveyor 34 to intercept the light to photoelectric cell 39 from source 41 (Figs. 1 and 2). As a result, solenoid 38 will be de-energized to lower gate 36. When the town index card is moved past photoelectric cell 39, that cell is again energized as is solenoid 38 which now raises gate 36 so that the town index card will be retained at the copying station 33. The first subscription card will be approaching photoelectric cell 39, the second subscription card will have been moved away from the sensing station 32 and the third subscription card will have moved into the sensing station to be retained for a given period of time.

When terminal 408 on strip 402 (Fig. 2) of bank 341 was connected to B+ as previously described, a positive potential was applied to terminal 454 (Fig. 6) through closed contacts 356, 359 of relay 349 of bank 341 and lead 406. This potential is applied at the same time as the town index card is retained at the copying station as the stepping switch arms 434 would have been advanced to the fourth contact 432 by the rotation of wheel 497 by motor M which also advances the cards.

Terminal 454 is connected through inverter multivibrator unit 278 (Fig. 1) to terminal 631 of mailing classifier unit 229 (Fig. 7). Consequently, a positive pulse will be applied through previously closed contacts 596, 603 of relay 591, lead 627, contact 601 of relay 595, arm 597, coil 607, lead 614, closed contacts 602, 598 of relay 594, lead 613 to ground. Energization of relay 595 will bring arm 597 against fixed contact 606 connected to B+ to provide a holding circuit for relay 595. In addition, arm 598 will move away from fixed contact 602 to break the circuit to coil 607 of relay 591 and arms 600, 596 and 599 will engage fixed contacts 605, 603 and 604 respectively. Thus the counting unit 545 will be readied to receive a pulse to effect the discrimination between bulk and individual mailing.

The town index card 22 at the copying station 33 is being scanned by the camera 647 (Fig. 1) and the information on such card is transmitted through cathode follower 655, closed contacts 659, 662 of the relay 661, and lead 664 to terminal 665 of imprinting unit 667 (Fig. 8). However as the recorders 679, 681, 693, 694 and 682 of imprinting unit 667 are not energized due to the bias thereon (previously described) and as the associated relays 718, 719, 721, 722 and 723 are not energized to overcome such bias, the town index card will not be copied.

At this time in the sequence of operation, the electronic beam from camera 51 will sweep row 24 of the third subscription card. Assume that the date code thereon is October '52 representing a card that is to be printed, the 1st, 4th, 5th, 6th and 10th thyratrons in the date code converter unit 95 will be energized for decoding of the date code by unit 213 in the manner previously described.

However, as there is no setting of the wafer switches in the date setting unit 265, corresponding to such date of October '52, none of the terminals on terminal strip 322 will be connected to B+. Consequently, none of the terminals 332, 333, 237, 334 or 223 of the delay unit will be connected to B+ by the scanning of row 24 of the third subscription card 21.

When the second row 25 of the third subscription card is scanned by the electronic beam, in the manner previously described, the count bar at region 1 on row 25 will cause the B+ source to be connected to counter 309 to count the third subscription card. In addition, B+ will be connected to terminal 233 of the delay signal unit 225 and B+ will be connected for a predetermined period to terminal 227 of the mailing classifier unit 229.

When terminal 233 of unit 225 (Fig. 6) is connected to B+ a circuit will be completed from such terminal 233, lead 388, fixed contact 363 of relay 351 of bank 344, arm 362, through coil 355, leads 389, 396, closed contacts 365, 372 of relay 352, lead 397, closed contacts 379, 381 of relay 353 to ground.

As a result, relay 351 of bank 344 will be energized and arm 357 which is connected to B+ will engage arm 362 to move it away from fixed contact 361 thereby to provide a holding circuit for relay 351 of bank 344 and arm 356 will engage fixed contact 359.

Referring to Fig. 7 when terminal 227 of the mailing classifier unit is connected to B+, a circuit will be completed through lead 538, closed contacts 514, 518 of relay 510, input terminal 539 of counting unit 545, through closed contacts 563, 565 of previously energized relay 547 of unit 545, lead 587, fixed contact 573 of relay 548, movable arm 571 engaging such fixed contact, coil 553, leads 584, 585, closed contacts 575, 576 of relay 549 to ground.

As a result of this circuit relay 548 of counting unit 545 will be energized so that movable arm 571 will engage fixed contact 574 connected to B+ to provide a holding circuit for said relay and arm 569 will move away from fixed contact 572 to break the circuit to relays 546, 547 to open the contacts 556, 559 of relay 546.

At this time, the wheel 497 (Fig. 2) will have been rotated by motor M so that wiper arm 496 no longer engages arcuate contact 498 to break the circuit from B+ to coil 435 of stepping switch 428, and the arms 434 of the stepping switch 428 will move to engage contacts 433.

As a result, relay 352 of bank 344 will be deenergized so that movable arms 365 to 370 will move away from fixed contacts 372 to 377 and relay 353 of bank 345 will be de-energized so that contacts 379, 381 will engage. However, relay 351 of bank 344 will remain energized due to its holding circuit from B+.

In addition, a circuit will be completed from B+ through lead 436, arms 434 of switch 428 (Fig. 2), contacts 433, to terminal 416; terminals 408, 415, 414 and terminal 401 on terminal strip 402 associated with banks 345, 342 and 341 of delay unit 225.

When terminal 416 of bank 345 (Fig. 6) is connected to B+, the coil 378 of relay 352 of bank 345 will be energized. When terminals 408, 415, and 414 of bank 342 are connected to B+, the terminals 452, 456 and 455 on strip 457 of the delay unit will also be connected to B+ through the closed contacts of relays 346, 351 and 359 of bank 342 and leads 403, 422 and 419 respectively. When terminal 401 of bank 341 is connected to B+, relay 353 of bank 341 will be energized to open its contacts 379, 381 thereby breaking the circuit from ground to the coil 355 of relay 349 of bank 341 to deenergize such relay to ready the latter for the next cycle.

When relay 352 of bank 345 is energized, the movable arms 365 to 370 thereof will engage the associated fixed contacts 372 to 377 respectively, to ground one side of the coils 355 of said relays 346 to 351.

After a period of say .15 second the third subscription card at the sensing station will be released and advanced by the conveyor 34 and the next card in the hopper 35 which illustratively is a second town index card will be moved by the advancing mechanism to the sensing station 32.

When the third subscription card 21 moves away from the sensing station 32, photoelectric cell 488 (Fig. 2) will again be energized so that arm 485 of relay 484 will engage fixed contact 483. However, as wheel 497 has been rotated so that arcuate contact 498 is no longer engaging wiper arm 496 there will be an open circuit from B+ to the coil 490 of relay 491 so that motor M will remain energized.

Just prior to the movement of contact 98 away from wiper arm 101 to disconnect from ground amplifier 84, the momentary engagement of contact 198 on contact wheel 199 will break the circuit from B+, through lead 192 (Figs. 1 and 2) to terminal 191 of date code converter unit 95. As a result, the thyratrons 187 in unit 95 which had been previously conducting due to the October '52 code on the third subscription card will be cut off to open the associated relays 204 to recycle the unit.

When the second town index card comes to rest at the sensing station it will intercept the light to photoelectric cell 488 (Fig. 2), for engagement of contact 500, by arm 485.

As motor M rotates wheel 497, the arcuate strip 498 connected to B+ will engage wiper arm 496 for energization of coil 435 of switch 428, which however as previously pointed out, will not move the arms 434 of said switch.

At this stage in the sequence of operations, the first subscription card will have been moved by the conveyor 34 to intercept the light to photoelectric cell 39 from source 41. As a result, solenoid 38 will be deenergized to lower gate 36 to release the first town index card so that it will be discharged over closed hopper 42 into hopper 43. When the first subscription card is moved past photoelectric cell 39, that cell is again energized as is solenoid 38 which now raises gate 36 so that the first subscription card will be retained at the copying station. The second subscription card will be approaching photoelectric cell 39, the third subscription card will have been moved away from the sensing station 32 and the second town index card will have moved into the sensing station to be retained for a given period of time.

When the first subscription card is retained at the copying station it will intercept the light the photoelectric cell 479. As a result, relay 475 (Fig. 2) will be deenergized so that arm 477 will move away from fixed contact 481 and arm 474 will engage fixed contact 476 connected to wiper arm 496.

When terminals 408, 415, 414 on strip 402 of bank 342 (Fig. 6) were connected to B+, as previously described, a positive potential was applied to terminals 452, 456 and 455 of delay unit 225 through closed contacts 356, 359 of relays 347, 351 and 350 respectively of bank 342. These potentials to terminals 452, 456 and 455 are applied at the same time as the first subscription card is retained at the copying station. Terminal 452 is connected by lead 448 (Fig. 1) through inverter-multi-vibrator unit 278 to terminal 729 of imprinting unit 667 shown in Fig. 8. Consequently, a positive pulse of predetermined duration, illustratively .1 of a second will be applied from terminal 729 through lead 727 to one side of the coil 725 of relay 719. As the other side of such coil is connected to ground, the coil will be energized to bring movable contact arms 717 and 758 into engagement with fixed contacts 724 and 759 respectively. As a result of the engagement of contacts 717 and 724, the negative bias on the receiver 681 will be overcome so that it will be in condition to imprint information on sensitized paper strip 713. The engagement of contacts 758, 759 will energize coil 762 of solenoid 763 to lift the plunger 766 thereof. However as shown in Fig. 9, as the pawl 765 will ratchet over teeth 771 no movement will be imparted to the strip 713 by the energization of coil 762.

As shown in Fig. 1, the camera 647 will be scanning the first subscription card at the copying station 33 and the information on such card i.e., the name and address of the subscriber and date of expiration for example, will be fed through cathode follower 655, closed contacts 659, 662 of relay 661, lead 664 to terminal 665 of imprinting unit 667 (Fig. 8) through leads 676 and 675, into the imprinting receiver or recorder 681.

As the bias on receiver 681 has already been removed as previously described, the name, address and other information on the first subscription card picked up by camera 647 will be projected on the sensitized paper strip 713 in closed chamber 711.

When terminal 456 of delay unit 225 (Fig. 6) is connected to B+, as previously described, the terminal 633 of mailing classifier unit 229 (Fig. 1) will also be connected to B+ through lead 399. As a result such B+ potential will be applied from terminal 633 of mailing classifier unit 229 shown in Fig. 7, lead 632 through closed contacts 599, 604 of relay 595, lead 643, to arm 556 of relay 546 of counting unit 545. As such arm 556 is spaced from its associated fixed contact 559 by reason of the energization of relay 548, as previously described, due to the three successive subscription cards, such B+ potential will not be applied to terminal 582 of the mailing classifier unit 229 connected to terminal 748 of the imprinting unit 667 (Fig. 8) which is turn is connected by lead 747 to coil 735 of mailing selector relay 685. As a result, such relay will not be energized when there are three successive subscription cards and line 676 will remain connected through closed contacts 684, 686 of relay 685 to bulk recorder 693.

When terminal 456 of the delay unit shown in Fig. 6 is connected to B+, a circuit will also be completed from such terminal through lead 400 (Fig. 1) inverter multi-vibrator unit 278, through closed contacts 502, 503 of relay 661, and lead 504 to terminal 784 of imprinting unit 667 (Fig. 8). As a result, the coil 725 of relay 723 will be energized through closed switch 742 and the coil 725 of relay 721 will be energized through closed switch 782 and closed contacts 733 and 734 of relay 685 which as previously pointed out is not energized when there are three successive subscription cards.

When relays 721 and 723 are energized, the arms 717 and 758 thereof will engage the associated fixed contacts 724 and 759 to energize the associated solenoids 763 and remove the bias from the recorders 693, 682. As a result, at the same time that the information on the first subscription card is being printed on sensitized paper strip 713 by recorder 681, the same information will be fed from camera 647 to terminal 665 of imprinting unit 667 (Fig. 8) through lead 676, to the recorders 693 and 682 to imprint such information upon sensitized paper srtips 713 associated therewith.

In addition, when relays 721 and 723 are energized, their arms 791 will engage the associated fixed contacts 792. As a result, a circuit will be completed from B+ through closed contacts 792, 791 of relay 721 lead 793 to terminal 795 on terminal strip 731 in Fig. 8. A circuit will also be completed from B+ through closed contacts 791, 792 of relay 723, to contact 797 of switch 803, which switch however is open when switch 782 is closed.

As terminal 795 is thus connected to B+, the common main 801 (Fig. 1) of counters 589 will also be connected to B+ through lead 798. Consequently, as counter 589A for the first postal zone has previously been placed into circuit by reason of the postal zone code on the first index card, it will be energized to count the first subscription card for a subscription to be bulk mailed to postal zone one.

When terminal 455 of the delay unit is connected to B+, as previously described, a circuit will be completed through lead 398 (Fig. 1) through inverter multi-vibrator unit 278 to energize solenoid 47. As a result, as shown in Fig. 2, the cover 45 of hopper 42 will be raised into the path of movement of the first subscription card when it is subsequently advanced by conveyor 34.

As motor M rotates wheel 497, the arcuate contact 498 connected to B+ will engage wiper arm 496 to complete a circuit from B+ through lead 473 to energize coil 435 of stepping switch 428. When wheel 497 has turned sufficiently to break circuit to wiper arm 496, coil 435 is no longer energized and stepping switch 428 will be released to advance for its arms 434 to return to the first contact 429. As a result the operations previously described when contacts 429 were connected to B+ will be repeated.

At this time in the sequence of operation, the electronic beam from camera 51 will sweep row 24a of the second town index card. As previously pointed out, the beam will encounter a bar at region 13 on the card and the relay 177 (Fig. 1) will be energized due to a positive pulse from the thirteenth thyratron in the date code converter unit 95. As a result, contacts 178, 179 of relay 177 will open to break the circuit to the thyratrons in the postal zone converter unit 96 to recycle such unit so that it will be readied for the postal zone information as well as the town index pulse due to the code on the second town index card.

When the second row 25a of the second town index card is scanned by the electronic beam, in the manner previously described, any code bars at regions two to five will be picked up. Assuming that the postal zone on the second town index card is two, there will be a bar at region three (Fig. 10) and in the manner previously described, one side of the counter 589B and 589'B will be connected to ground. When the electronic beam picks up the bar at region six representing the town index code positive pulses will simultaneously be impressed on terminals 334 of the delay unit 225 (Fig. 6) and 235 of the mailing classifier unit 229 (Fig. 7).

As previously described when terminal 334 of the delay unit is connected to B+, index relay 349 of bank 341 will be energized so that contacts 356, 359 will engage.

When terminal 235 of the mailing classifier unit 229 (Fig. 7) is again connected to B+ a circuit will be completed from such terminal through lead 532, closed contacts 513, 517 of relay 510, lead 533, closed contacts 515, 511 of relay 509, coil 521 of said relay, lead 528 through closed contacts 512, 516 of relay 508, lead 526 to ground. The thus energized relay 509 causes arm 511 to engage fixed contact 519 connected to B+ to provide a holding circuit for such relay. In addition, arm 513, will engage contact 517; arm 514 will engage contact 518, and arm 512 will move away from contact 516 to break the holding circuit for the coil 521 of relay 510. As a result, relay 510 will be de-energized so that the arms 514, 513 and 511 will move away from the associated fixed contacts 518, 517 and 519 and arms 511 and 512 will re-engage the associated fixed contacts 515 and 516.

The operation of the equipment thus far described has resulted in the imprinting of the information on the first subscription card by recorder 693 on the bulk mailing list, by recorder 682 on the galley list and by recorder 681 on the expire list. As the operation of the equipment continues and the first subscription card is moved away from the copying station by conveyer 34, it will abut against raised cover 45 to be deflected into the reject hopper 42 inasmuch as the date on such card, i.e., June '52 is an expire date. At this time the solenoid 47 will be de-energized by reason of the cessation of the pulse from the inverter multi-vibrator unit 278 and cover 45 will return to closed position.

When the positive potential applied to terminals 729 and 784 of the imprinting unit 667 ceased due to the termination of the pulse from inverter multi-vibrator units 278 in leads 448 and 400 respectively, the relays 719, 721 and 723 reopened. As a result the cut off bias is again restored to recorders 681, 693, and 682; the positive potential removed from counters 589 and the associated solenoids 763 de-energized so that the coil spring 767 (Fig. 8) will retract the plungers 766 (Fig. 9) for advance of the rollers 714 by the coacting pawl 765 and ratchet wheel 764. Consequently, the sensitized paper strip 713, of the recorders 681, 693, and 682 will be advanced one space to be ready for the next imprinting action.

As the cards are subsequently advanced through the system and the second subscription card which has a July '52 date thereon reaches the copying station, in the manner previously described the bulk recorder 693 and galley list recorder 682 will be energized to print the name and address upon the sensitized paper strip 713. In addition, due to such July '52 date on the card, the terminal 728 of the imprinting unit will be connected to B+ as a result of the positive potential applied from terminal 451 of the delay signal unit 225. Consequently, the information on the second subscription card will be imprinted by the recorder 679 on the associated sensitized paper strip 713. In addition the counter 589A will again be energized to count such second card.

When the third subscription card reaches the copying station, inasmuch as the date of October '52 is not included in the setup of the date setting unit 265, only the bulk recorder 693 and the galley list recorder 682 will be energized in the manner previously described and the counter 589A will also be energized.

The operations above described will of course continue as long as cards are fed from the hopper 35.

In the event that not more than two subscription cards are present between the two town index cards, it is apparent, referring to the mailing classifier unit 229 shown in Fig. 7, that only relays 546 and 547 of counting unit 545 would be energized before the code bar at region 6 on the second town index card when at the sensing station caused such counting unit 545 to be disconnected by the opening of contacts 514, 518 of relay 510 and connected the second counting unit 544 into circuit.

Consequently when the count pulse transmitted as a result of the code bar at region one on the first subscription card of the two in sequence, was connected to terminal 633 of the mailing classifier unit at the same time as the first subscription card was at the copying station 32, the B+ potential applied to terminal 633 would pass through line 632, closed contacts 599, 604 of relay 595, lead 643 through closed contacts 556, 559 of relay 546, lead 581 to terminal 582 of the mailing classifier unit. As a result, the terminal 748 of the imprinting unit 667 (Fig. 8) would be connected to B+ to energize the coil 735 of the mailing selector relay 685. Consequently, arm 684 would engage fixed contact 687 to connect line 676 to individual recorder 694. Due to the opening of contacts 733, 744 of relay 685, the relay 721 would be cut out of circuit so that the bias on recorder 693 would prevent its operation. The closing of contacts 744, 745 would connect relay 722 into circuit so that the bias on recorder 694 would be overcome at the proper time as previously described and the sensitized paper strip 713 could be advanced after information has been printed thereon.

In addition, when relay 722 was energized and its contacts 791, 792 brought into engagement, a circuit would be completed from B+ through such closed contacts 791, 792, lead 794, to terminal 796 on terminal strip 731 which is connected by lead 799 (Fig. 1) to counters 589'. If the first card should be in postal zone one, counter 589'A would have already been connected to ground and consequently would be energized to count the first subscription card in the individual count group.

The counting units 548 to 541 in the mailing classifier unit 229 (Fig. 7) are recycled by the pulse caused by the code bar at region six on the index cards. Thus, when the second town index card reaches the copying station, the terminal 631 of the mailing classifier unit will be connected to B+ due to the connection of terminal 454 of delay unit 225 to B+. As a result, a circuit will be completed through lead 629, closed contacts 596, 603 of relay 595, lead 618, fixed contact 601 of relay 594, movable arm 597, coil 607, lead 615, closed contacts 602, 598 of relay 593, lead 613 to ground. As a result of this circuit, relay 594 will be energized so that arm 597 will engage fixed contact 606 connected to B+ to provide a holding circuit for said relay. In addition, arms 596, 599 and 600 of relay 594 will engage the associated fixed contacts 603, 604 and 605 and arm 598 will move away from fixed contact 602. When arm 600 of relay 594 engages fixed contact 605, a circuit will be completed from terminal 631 which is connected to B+ through closed contacts 596, 603, of relay 595, leads 618, 619 through closed contacts 600, 605 of relay 594, lead 635 to coil 554 of relay 549 of counting unit 545 and thence to ground. As a result, contacts 575, 576 of relay 549 will open to break the circuit from ground to the coil of relay 548 if there were three intervening subscription cards or to the coils of relays 546, and 547 if there were only two intervening subscription cards. As a result, counting unit 545 will be recycled. In a similar manner, as successive town index cards connect terminal 631 to B+ the counting units 544 to 541 will be recycled.

When contacts 602, 598 of relay 594 move apart as previously described, the holding circuit to coil 607 of relay 595 will be broken so that this relay will also be recycled. These contacts are designed to remain closed for a sufficient period of time to permit relay 554 to be energized through closed contacts 596, 603 of relay 595.

The operation of the equipment thus far described illustrates its use in printing by recorder 681 a list of subscriptions expiring in a current month; a list of subscription illustratively expiring in say any one of the three months periods subsequent to the current month by recorder 679; a galley list by recorder 682 of all subscribers to receive issues of the periodical; a bulk mailing list by recorder 693 of groups of more than two subscribers to receive issues in each town and an individual list by recorder 694 of groups of not more than two subscribers to receive issues in each town.

The equipment rejects into hopper 42 those cards of subscriptions that expire in the current month, so that the single master list of cards will contain only the names of those subscribers who are to receive issues. It counts all the subscription cards that have passed through the system on counter 309. It counts the number of subscriptions for each postal zone in two classifications, bulk and individual mailing respectively on counters 589 and 589'.

After all the subscription and town index cards have passed through the equipment, the sensitized paper strips 713 are removed from chambers 711 and processed so that they may be used as desired.

By a simple switching operation, the equipment may be set up to retain in rather than reject from the file, cards for subscriptions that have already expired for say a two month period prior to the current month. The equipment as thus set up will not print the information on the past expired cards and will reject from the files those cards of subscribers whose subscriptions have expired say three months prior to the current month. In addition, the equipment will imprint a list of subscriptions expiring in a current month, a list of subscriptions illustratively expiring in say any one of the three months subsequent to the current month and a galley list of all subscribers to receive issues. The equipment will also count all the cards on counter 309 and current cards according to postal zones on counter 589'.

When the equipment is set up to handle past expired cards, the bulk and individual printers are illustratively switched out of circuit.

To set up the equipment so that it may handle past expired cards, according to one mode of operation, it is merely necessary to open switch 782 shown in Fig. 8 to prevent the bias on bulk and individual recorders 693 and 694 from being overcome so that they will remain inoperative. Switch 803 is closed and switches 523 and 609 of the mailing classifier unit 229 are left open so that no current can reach its relays and it will not function.

The date setting switch unit shown in Fig. 5 is set up, for example so that arms 288 of wafer switches 285A to H engage the 6th, 7th, 8th, 9th, 5th, 4th, 3rd and 3rd fixed contacts 289 respectively representing the months of June, July, August, September, May, April, March and March. The arms 288 of wafer switches 286A to H are all set up to engage the 5th contact 239 representing the decade 5 and the arms 288 of wafer switches 287A to H are set up to engage the second fixed contact 289 representing the year.

When the equipment is thus set up if the first subscription card at the sensing station should have a June '52 date thereon, as previously described, when such card reaches the copying station, appropriate signals will pass through the system to energize the recorders 681 and 682 so that the name of the subscriber whose subscription expires in the current month will be imprinted on two lists, i.e., the expire list and the galley list. In addition, as previously described, the appropriate counter 589', depending upon the postal zone indicated on the town index card preceding such subscriber card, will be energized due to the energization of relay 723 by the pulse from terminal 456 of delay unit 225 through lead 400, inverter multi-vibrator unit 278, closed contacts 502, 503 of relay 661, lead 504 to terminal 784 of imprinting unit 667 which is connected to relay 723 through lead 784 and closed switch 742. When relay 723 is energized, its closed contacts 791, 792 will complete a circuit from B+ through closed switch 803 to terminal 796 and thence by lead 799 to counters 589'.

Although, as previously described, when such first subscription card is at the copying station, a pulse will be delivered to terminal 784 from terminal 456 of the delay unit, as switch 782 is open the relay 721 will not be energized and bulk recorder 693 will be biased to cut off. In addition, as switches 523 and 609 of the mailing classifier unit are open, no pulse will be applied to terminal 748 to affect the mailing selector relay 685 so that the individual recorder 694 will remain out of circuit. Consequently, there will be no imprinting of either bulk or individual listings.

When the second subscription card reaches the copying station, if such card has a date of say July '52, it will also be copied, but in this case by recorder 679, i.e., the pre-expire recorder, due to the pulse from terminal 451 of delay unit 225 caused by the connection of terminal 332 thereof to B+ from terminal 325 of the date setting unit due to the July '52 date.

In addition, the card will be copied by galley list recorder 682 due to the connection of terminal 484 to B+ as previously described and such card will also be counted by the same counter 589' that counted the first card due to closed switch 803 as well as by counter 309 which counts all of the subscription cards regardless of whether they are current or expired.

When the code representing say the date May '52 on the third subscription card is scanned when such card is at the sensing station 32, circuits will be completed similar to those previously described so that the relays 268E, 269E and 271B will be energized representing the date May '52. As a result, as previously described, a circuit will be completed from B+ through wafer switches 287E, 286E and 285E, lead 326 to terminal 327 on unit 265 shown in Fig. 5 to connect terminal 327 to B+.

As a result, as shown in Fig. 1, terminal 237 of delay unit 225 will be connected to B+ and through lead 124 the coil 123 of relay 217 will be energized to open its contacts 220, 226. As previously described, when said third subscription card reaches the copying station, the signal applied to terminal 237 of the delay unit will be applied to terminal 453 of such unit thereby connecting the coil 663 of non-printing relay 661 to B+ through lead 449. Consequently, such relay will be energized to open its contacts 502, 503, and 659, 662. As a result the information on the third subscription card picked up by camera 647 will not pass through the open contact 659, 662 of such relay and hence no signal will be applied to terminal 665 of the imprinting unit 667 when such third subscription card having a past expired date thereon is at the copying station.

By reason of the opening of contacts 220, 226 of relay 217 as previously described, when the second row of the third subscription card is scanned, although as previously described, the terminal 1 of the postal zone converter unit 196 will be connected to B+ due to the code bar at region 1 on such third subscription card, no signal will pass through the open contacts 220, 226 of relay 217 and hence no count pulse will be delivered to terminal 227 of the mailing classifier unit. Although the terminal 233 of the delay unit will be connected to B+ by such count bar at region 1 on the third subscription card and the terminal 456 of such delay unit will be connected to B+, when such card is at the copying station, due to the open contacts 502, 503 of relay 661, no signal will be applied to terminal 784 of the imprinting unit 667 to energize its relay 723. As a result, the galley list recorder 682 will remain cut off. The connection of terminal 456 of the delay unit to B+ will also connect terminal 633 of the mailing classifier unit 229 to B+. However, as the switch 523 and 609 thereof are open the mailing classifier unit will be inoperative. As relay 723 is not energized, the counter 589' will also not be energized, hence the third subscription card will not be counted by such counter 589'. However, such card will be counted by counter 309 inasmuch as the latter is connected directly to terminal 1 of the postal zone converter unit.

When the fourth subscription card reaches the copying station as such card has a date of say March '52 thereon, as previously described with respect to the third subscription card, the terminal 327 of date setting unit 265 shown in Fig. 5 will be connected to B+ through wafer switches 287G, 286G, 285G. In addition, the terminal 329 of unit 265 will be connected to B+ through wafer switches 287H, 286H and 285H.

When terminal 327 is connected to B+ the operations just described with respect to the third subscription card with the date of May '52 thereon will also occur and only the counter 309 will be energized to count such fourth card.

When terminal 329 of unit 265 is connected to B+, the terminal 223 of the delay signal unit 225 will also be connected to B+. Consequently, when such fourth subscription card is at the copying station, the terminal 455 of the delay unit 225 will also be connected to B+ and consequently the solenoid 47 shown in Fig. 1 will be energized for a predetermined period due to inverter multi-vibrator 278. As a result, cover 45 will be raised so that when such fourth card is advanced by the conveyer it will be intercepted and discharged into reject hopper 42 as previously described.

The operation described with both expired and current cards in the file, illustrates the use of the equipment in imprinting a list of subscriptions expiring in a current month; by recorder 681; a list of subscriptions illustratively expiring in say the three month period subsequent to the current month by recorder 679 and a galley list of all subscribers to receive issues by recorder 652.

When all the cards to be classified have passed through the equipment, the sensitized paper strips 713 are removed from the chamber 711 and processed so that they may be used as desired.

The equipment as thus set up rejects those cards of subscriptions expiring in any desired past expired month and does not print the information on any of the past expired cards retained in the master file.

The system above described has means to insure that when the cards in hopper 35 are exhausted, operations will continue until the last card has passed the copying station 33.

Thus, when the town index card is retained at the copying station, it will intercept the light to photoelectric cell 479 (Fig. 2). As a result, relay 475 will be de-energized so that arm 477 will move away from fixed contact 481 and arm 474 will engage fixed contact 476.

In the event there was no card at the sensing station 32 so that photoelectric cell 488 was energized and a card was at the copying station 33, so that photoelectric cell 479 was de-energized, when arcuate contact 498 connected to B+ engages wiper arm 496, a circuit would be completed through contacts 483, 485 of relay 484 to movable arm 477 of relay 475. However, as the relay 475 has been de-energized by the interception of light to photoelectric cell 479, contacts 477 and 481 would be open to break the circuit to relay 491 so that it would remain deenergized and motor M would continue to rotate. In the event that there was no card at either the sensing or copying stations 32 or 33, a circuit would be completed from B+ through contact 498, wiper arm 496, lead 499, contacts 485, 483 of relay 484, lead 482, closed contacts 477, 481 to coil 490 of relay 491 so that arm 492 would be moved away from fixed contact 493 to break the circuit from B+ to motor M.

In the event that the feeding mechanism should, for example, deliver one card to the scanning station 32 and then break down after moving the card away from the scanning station so that no other card is delivered, there would be no card at either the scanning or copying stations and the motor M would be deenergized in the manner just described.

Thus the relays 475, 484 also act as a safeguard to prevent operation of the equipment in the event that the feeder 30 should fail and there should be no continuous sequence of cards fed to conveyor 34.

The system herein has been illustratively described:
(a) to classify only current subscriptions with bulk and individual mail groupings, and (b) to classify both current and past expired subscriptions with no bulk and individual mail groupings.

It is of course to be understood that it is within the scope of the invention to perform both of the functions (a) and (b) in a single run of the cards. If desired alphabetical index cards could be used to separate the subscription cards between successive town index cards. Such alphabetical index cards (not shown) have no code designations thereon, but only letters of the alphabet, and like the town index card in the embodiment herein, would not be printed or counted.

The presence of alphabetical index cards and past expire cards, which are of course not to be counted for bulk or individual mail, might result in erroneous classification between bulk and individual mailing were but two cards to intervene between the sensing station and the copying station, as illustrated.

Thus, for example, the sequence of cards could be as follows: a current subscription card at the copying station following a preceding town index card, and alphabetical index card at the sensing station, a current subscription card and a past expired subscription card intervening between such stations, and an additional current subscription card following the alphabetical index card with a town index card immediately thereafter.

In such case, the data on the current subscription card at the copying station will be imprinted on the individual mail list as the contacts 556, 559 of relay 546 of the readied counting unit of Fig. 7 would be closed when the impulse from the bar at region one of row 25 of such subscription card passed through such closed contacts in the manner previously described. Such classification would of course be erroneous as in fact three current subscription cards intervene between two town index cards, and the data on the current subscription card at the copying station should be imprinted on the bulk mailing list.

The likelihood of such erroneous classification would of course be greatly minimized if more than two cards intervened between the sensing station and the copying station. Although the two card arrangement is shown in the drawings and described herein, it is of course merely illustrative and it is within the scope of the invention to have any desired number of cards intervening between such stations.

It is to be understood that additional code designations could be applied to the cards herein for any desired purpose and such code designations would be utilized in a manner similar to that described with respect to the code designations shown in the drawings and described herein.

Thus, for example, if a code designation or bar should be at region seven on town index card 22, for example, and it was desired to use this bar to initiate an impulse to actuate non-print relay 661 (Fig. 1), it would merely be necessary to provide an additional multi-vibrator and associated components in the postal zone converter unit 96 and to connect the output of such unit related to such bar to terminal 237 of the delay unit 225 (Fig. 6) and the system would function in the manner previously described.

Although the invention has been illustratively described with respect to its application in the subscription fulfillment field, it is readily apparent that it could just as well be used in a multiplicity of other fields. Thus, for example, insurance records could be classified for selective printing depending upon the date of premium payment so that premium notices could be sent to the insured as well as lists prepared for transmittal to various statistical or accounting departments of the insurance company.

The equipment could also be used, for example, in the direct mail field so that in a single run of the cards through the equipment, separate mailing lists could be prepared for different categories. Thus, if the file contains the names of individuals in a given field and it is desired to send different literature to those individuals in such given field, who fall in different income categories, in one run a plurality of separate mailing lists can be prepared for this purpose.

These illustrative applications of the equipment are by no means all-inclusive and all applications possible within the ambit of the claims are within the scope of the invention from its broader aspects.

It is within the scope of the invention from its broader aspects to employ code designations that emit or reflect waves of any desired frequency between very wide limits or produce a field illustratively an electro-static or electromagnetic field and the sensing means is designed to be responsive to such reflected or emitted frequencies or to such field as the case may be.

While the invention in its various embodiments preferably utilizes imperforate cards, it is within the scope of the invention as defined in the broader claims to utilize perforations as the code designations.

Where imperforate cards or other carrying media are used with the items of indicia and codes thereon, such indicia and codes may readily be obliterated or covered and the cards or other carrying media may be reused with new or added indicia and/or codes.

While, as above described, it is ordinarily sufficient to imprint the data, it is within the scope of the invention to imprint not only the data but also the associated code designations so that the imprinted strip could be used for further classification or selection initiated by such imprinted code.

It is also within the scope of the invention to apply the indicia or data on the carrying medium therefor in any suitable manner such as by typewriting, printing, engraving, photographing or the like.

In the illustrative embodiment herein shown, the carrying media for the indicia, codes or data are cards. However, it is within the scope of the invention to use other types of carrying media such as sheets, strips, film and the like.

The term classify as used herein is generic to listing, tabulating or selecting according to any scheme of grouping and to physical segregation as rejecting or ejecting cards that have become obsolete.

As many changes could be made in the above system and equipment, and many apparently widely different embodiments of this invention could be made without departing from the scope of the claims, it is intended that all matter contained in the above description, or shown in the accompanying drawings, shall be interpreted as illustrative and not in a limiting sense.

Having thus described our invention, what we claim as new and desire to secure by Letters Patent of the United States is:

1. A system automatically to classify items of indicia which comprises means for electronically sensing in sequence code designations associated with and corresponding to the respective items, means for electrically and selectively establishing circuits, one for each code designation and uniquely corresponding to the code being sensed, said means including decoding means to convert each multiple circuit that represents but a single element of data into a unitary circuit, switch means pre-set at will to determine the desired scheme of classification, and means controlled by the selectively set circuits to effect the classification according to the setting of said switch means.

2. In a system for classifying items of data, comprising means for sensing in sequence code designations related to such items, each coded item being represented by one or more designations at various combinations of a limited number of code regions, means governed by the sensed code designations for setting up electrical impulses at corresponding intervals, switches corresponding in number to said code regions, means for selectively rendering operative those of said switches corresponding to the code designations, means selectively to be pre-set for classifying certain of said data, classifying instrumentalities controlled from the code selected switches to effect the desired classification in accordance with the setting of the pre-set means, and means associated with the code for each item but common to all of said items to perform further operations with respect to those items distinct from the operations determined by the pre-set means.

3. The combination set forth in claim 2 in which means are provided, governed by a particular setting of said pre-set means to prevent the performance of such further operations.

4. In a system for classifying items arranged in sets into two separate and distinct groups depending upon the number of items in each set, each of said items having a universal code designation associated therewith, each of said sets of items having a group designation at its beginning, means for sensing the group and the universal code designations, a plurality of counting units, means under control of each group code designation to ready one of the counting units, each counting unit having means under control of said universal code designations for adding up to and including a predetermined number of items in each set, to determine one of the group classifications, means under control of the next, if any, universal code designation in the same set to determine the other group classification, means to effect the classification previously determined by said counting unit, and means under control of each group code designation to unready a previously readied counting unit.

5. The combination recited in claim 4 in which separate and distinct cards carry the respective items as well as a corresponding code designation, each card also having the universal code designation and in which the group designation preceding each set is on an index card.

6. In a system for recording items arranged in sets, into two separate and distinct listings depending upon the number of items in each set, each of said items having a universal code designation associated therewith, each of said sets of items having a group code designation associated therewith, a sensing station, a copying station, means for feeding all of the code designations to be sensed in sequence at the sensing station and thereupon feeding the associated items to be sensed in sequence at the copying station, a pair of recording units, one of said recording units being normally connected for recording successive items when at said copying station, a plurality of counting units, means under control of each code designation when at said sensing station to ready one of the counting units, each counting unit having means under control of successive universal code designations at said sensing station for adding up to a given number of items in each set, means under control of the next group code designation to inhibit the further addition by the readied counting unit should the sequence between two consecutive group code designations be less than said given number, means readied by said inhibiting means and under control of successive universal code designations as the items of the set are sensed at the copying station to effect shifting to the second recording unit and to record each item thereat until the next group code designation reaches the copying station, whereby when the sequence of universal code designations is at least equal to said given number, the normally connected recording unit remains so connected to record each item in such sequence.

7. The combination set forth in claim 6 in which each counting unit comprises a group of relays equal in number to said given number, said universal code designations being connected successively to control the actuation of the relays in said group, a switch controlling the shifting to the second recording unit and closed by the actuation of said relays in such group, an additional relay, all of said relays being arranged in cascade, means controlled by the next universal code designation to energize such additional relay, and means to open said switch upon actuation of said additional relay.

8. The combination set forth in claim 6 having a circuit with a plurality of memory units connected to be set under control of successive universal code designations at the sensing station, and means connected for operation as the corresponding items are successively sensed at the copying station successively to establish circuits through such set memory units to energize said shifting means.

9. A subscription fulfillment system for classifying individual cards bearing the subscription data and bearing also associated date code, each code being represented by one or more code designations at various combinations of a limited number of code regions, each of said cards also bearing a common code designation associated with the code thereon, said system comprising means for feeding such cards in succession, means for sensing the code on such cards, means initiated by the sensed code designations for setting up electrical impulses at corresponding intervals, switches corresponding in number to such code regions, means for selectively rendering operative those of said switches corresponding to the code designations, date-setting switches arranged to be pre-set at will for one or more dates, recorders controlled from the respective code-selected switches to tabulate subscriptions corresponding to the date settings of the respective pre-set switches, and recorder means under control of such common designation to effect tabulation of all subscriptions.

10. The combination recited in claim 9 in which the code only is sensed at the sensing station and the subscription data on each card is sensed at a copying station after the sensing station, in which the various recorders are under control of a video camera at the copying station and in which the circuits for actuating the respective recorders are set under control of the code sensed at the sensing station, and in which means timed with the movement of the card renders effective the set circuits when the corresponding code bearing card reaches the copying station for the respective recording operations.

11. In a system for subscription fulfillment for classifying code carrying media associated with the individual subscriptions, each of said media having a common code designation and code carrying media corresponding to the postal zone of the subscriber's address, said system comprising means for automatically discriminating between groups of subscriptions entitled to bulk mailing rates and those requiring individual mailing rates for any postal zone, recorders under control of said discriminator providing tabulations respectively of bulk mail and of individual mail subscriptions, two sets of counters, each counter separately adding subscriptions for the respective postal zones, one set for bulk mail and the other for individual mail subscriptions, means responsive to the postal zone code for the respective subscriptions to ready the corresponding counter of each of the two sets, and means under control of said discriminator to select the corresponding set of counters and for actuation of the previously readied counter of the selected set.

12. The combination recited in claim 11 in which the actuation of the previously readied counter of the selected set is effected under control of a common code designation associated with each code carrying media.

13. A system for subscription fulfillment for classifying individual cards for codes of subscription data arranged according to towns, said codes being related to month, decade and year of expiration date, each subscription code carrying card having an associated code designation common to them all, and cards for further codes corresponding to postal zone and associated with the respective groups of subscription code carrying cards for various towns, the code of each category comprising designations at one or more of a plurality of definite regions with respect to the subscription data, said system comprising a sensing station having sensing means thereat, means for advancing both the individual date and the postal zone code carrying cards in sequence past said sensing station, a pair of converters respectively controlled from the sensed date code and postal zone code, each of said converters having switches corresponding to the respective regions at which code designations of the date code and postal zone code respectively may occur and be controlled thereby, whereby in response to each code only those switches of the respective converters will be actuated which correspond to the regions on the cards at which the respective code designations appear, decoding means associated with the date code converter connected to establish unitary circuits of month, decade and year respectively, decoding means associated with the postal zone converter connected to establish a unitary circuit for postal zone, switch means adapted to be manually pre-set for month, decade and year related to any expiration date, said switch means determining the establishment of circuits under control of those unitary circuits established by the date code converter, receivers under control of the pre-set switch means to tabulate subscriptions accordingly, counters corresponding to the respective postal zones, connected to be selectively readied by the unitary postal zone decoder, and means under control of said common code designation on the subscription card to effect actuation of the readied postal zone counter for each subscription.

14. The combination set forth in claim 13 which has a thyratron control tube energized to actuate each of the switches in said converters, and means timed with the sensing means de-energizes such thyratron control tubes to re-cycle the switches.

15. The combination set forth in claim 13 in which a thyratron control tube is energized to actuate each of the switches in said date code converter, and a rotary switch timed with said sensing means controls the deenergization of said thyratron control tubes to re-cycle the switches in said date code converter.

16. The combination recited in claim 13 in which the postal zone cards and subscription cards have the codes thereon at separate and distinct regions and in which the sensing station comprises an electronic scanner and there is means to effect successive scanning of said regions by said electronic scanner, and to switch the output of said electronic scanner to alternate between the date code converter and the postal zone converter.

17. The combination recited in claim 13 in which the postal zone code on the postal zone cards is out of registry with the date code on the subscription cards and in which the sensing means consists of an electronic scanner and there is switching means alternately to deliver impulses from the scanner to the date code and postal zone converter and in synchronism therewith alternately to direct the scanning beam along the row in which appears the code on the subscription card and that along which appears the code on the postal zone cards.

18. The combination set forth in claim 13 in which the code region on the postal zone card is along a row out of registry with the date code on the subscription card and in which the sensing station comprises an electronic scanner to traverse the code regions on the subscription cards, in which there is means to deflect the electronic scanner from one row to the other row, means actuated simultaneously with the deflection of the electronic scanner to switch its output to alternate between the date code converter and the postal zone converter, in which a thyratron control tube is energized to actuate each of the switches in one of said converters, and means controlled by the means to deflect the electronic scanner beam de-energizes such thyratron control tubes to re-cycle the switches in said converter.

19. The combination set forth in claim 13 in which the code region on the postal zone card is along a row out of registry with the date code on the subscription card and in which the sensing station comprises an electronic scanner to traverse the code regions on the subscription cards, in which there is means to deflect the electronic scanner from one row to the other row, means actuated simultaneously with the deflection of the electronic scanner to switch its output to alternate between the date code converter and the postal zone converter, in which a thyratron control tube is energized to actuate each of said switches in one of the converters, a switch in the other of said converters controls the thyratrons in the first named converter, and means controlled by the electronic scanning beam controls said switch to de-energize said thyratrons to re-cycle the switches in said first named converter.

20. The combination set forth in claim 13 in which each postal zone card has a group code designation and each subscription card has a universal code designation and data thereon, and in which the advancing means propels the card from the sensing station to a copying station, a pair of recording units, one of said recording units being normally connected for recording the data on successive subscription cards when at said copying station, a plurality of counting units, means under control of each group code designation when at said sensing station to ready one of the counting units, each counting unit having means under control of successive universal code designations at said sensing station for adding the number of subscription cards in each set, means under control of the next group code designation to inhibit the further addition by the readied counting unit should the sequence between two consecutive group code designations be less than a given number, means readied by said inhibiting means and under control of successive universal code designations as the cards of the group are sensed at the copying station to effect shifting to the second recording unit and to record the data on successive cards thereat until the next group code designation reaches the copying station, whereby, when the sequence of universal code designations between consecutive group code designations is at least equal to said given number, the normally connected recording unit remains so connected to record the data on each card in such sequence.

21. The combination recited in claim 13 in which the advancing means propels the cards from the sensing station to a copying station, and in which the receivers are under control of a video camera at the copying station to tabulate the subscriptions.

22. The combination set forth in claim 13 in which the advancing means propels the cards in sequence from a hopper past said sensing station and past a copying station, a motor drives said advancing means, in which there is a relay with a normally closed switch for completion of a circuit from a power source to said motor, a normally closed switch at the sensing station, a normally closed switch at the copying station, said switches being connected in a series circuit with said relay, means controlled by a card at either station to open the associated switch, and means controlled by the motor intermittently to energize said series circuit, whereby if both switches are closed and an impulse is delivered by said intermittent energizing means, said relay will be energized to break the circuit to said motor to de-energize the advancing means.

23. In a system for classifying data on a data carrying medium, each datum represented by one or more code designations associated therewith in various combinations within a definite number of code regions, said system comprising a sensing station, a copying station, means for feeding the data carrying medium with the associated code designations in sequence from the sensing station to the copying station, means for setting at least one circuit determined by code designations when at the sensing station, said setting means comprising a plurality of like memory units, at least equal in number to the number of data carrying medium at and between the sensing and copying stations, each unit having a separate and distinct memory relay for each classification, and means successively to ready the memory units preparatory to selective setting of relays thereof, each memory relay of each memory unit having a switch associated therewith, each unit having a coil actuating all of the switches, each memory relay having an associated holding circuit and the means to ready the memory units comprises a stepping switch which disconnects the previously energized coil while the memory relays remain closed and said stepping switch also constitutes the means to transmit the impulse which is determined by the said relay when the associated data has reached the copying station, each unit having a switch actuated by said stepping switch after such impulse has thus been transmitted, said switch serving to break the holding circuits, and means for transmitting an impulse through each said circuit when the data reaches the copying station to actuate the latter.

24. In a system for classifying data on a data carrying medium, each datum represented by one or more code designations associated therewith in various combinations within a definite number of code regions, a sensing station, a copying station, means for feeding the data carrying medium with the associated code designations in sequence from the sensing station to the copying station, means for setting at least one circuit determined by code designations when the data carrying medium is at the sensing station, said setting means comprising a plurality of like memory units at least equal in number to the number of data carrying medium at and between the sensing and copying stations, each unit having a separate and distinct memory relay for each classification and means successively to ready to memory units preparatory to selective setting of relays thereof, and means for transmitting an impulse through each set circuit when the data carrying medium reaches the copying station to actuate said station.

References Cited in the file of this patent
UNITED STATES PATENTS

| | | |
|---|---|---|
| 2,124,906 | Bryce | July 26, 1938 |
| 2,224,646 | Friedman et al. | Dec. 10, 1940 |
| 2,308,927 | Maul | Jan. 19, 1943 |
| 2,377,762 | Daly | June 5, 1945 |
| 2,558,941 | Durfee | July 3, 1951 |
| 2,564,151 | Brown | Aug. 14, 1951 |
| 2,569,829 | Rabenda | Oct. 2, 1951 |
| 2,573,313 | Dayger et al. | Oct. 30, 1951 |
| 2,615,629 | Dayger et al. | Oct. 28, 1952 |